US008825263B1

(12) United States Patent
Nelson, Jr.

(10) Patent No.: US 8,825,263 B1
(45) Date of Patent: Sep. 2, 2014

(54) VEHICLE GUIDANCE BASED ON TRACTOR POSITION

(71) Applicant: Robert Leonard Nelson, Jr., Austin, TX (US)

(72) Inventor: Robert Leonard Nelson, Jr., Austin, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 13/795,700

(22) Filed: Mar. 12, 2013

(51) Int. Cl.
*G01C 21/36* (2006.01)
*G05D 1/02* (2006.01)

(52) U.S. Cl.
CPC .......... *G05D 1/0212* (2013.01); *G01C 21/3617* (2013.01); *G01C 21/362* (2013.01); *G01C 21/3614* (2013.01)
USPC ................ 701/25; 701/50; 701/412; 701/469

(58) Field of Classification Search
CPC ............... G01C 21/3691; G01C 21/36; G01C 21/3601; G01C 21/362; G01C 21/3611; G01C 21/3614; G01C 21/3617; B62D 6/00; B62D 15/00; B62D 13/005; B62D 6/02; B62D 7/142; A01D 34/00; A01D 34/835; G05D 1/0212
USPC ........... 701/24, 25, 26, 23, 50, 409, 410, 411, 701/412, 438, 431, 469, 41; 180/418, 419; 280/400, 411.1, 426, 442
See application file for complete search history.

(56) References Cited

U.S. PATENT DOCUMENTS

| 4,184,551 | A | 1/1980 | Orthman |
| 5,375,059 | A | 12/1994 | Kyrtsos et al. |
| 5,390,125 | A | 2/1995 | Sennott et al. |
| 5,438,517 | A | 8/1995 | Sennott et al. |
| 5,555,503 | A | 9/1996 | Kyrtsos et al. |
| 5,610,815 | A | 3/1997 | Gudat et al. |
| 5,629,855 | A | 5/1997 | Kyrtsos et al. |
| 5,928,309 | A | 7/1999 | Korver et al. |
| 5,941,317 | A | 8/1999 | Mansur |
| 6,052,647 | A | 4/2000 | Parkinson et al. |
| 6,244,366 | B1 * | 6/2001 | Otterson et al. ................ 180/11 |
| 6,354,231 | B1 | 3/2002 | Morris |
| 6,434,462 | B1 | 8/2002 | Bevly et al. |

(Continued)

OTHER PUBLICATIONS

"SBG Precision Farming: Appendix A, Product Overview 2014", (2014), 11 pgs.

(Continued)

*Primary Examiner* — Richard Camby
(74) *Attorney, Agent, or Firm* — Schwegman, Lundberg & Woessner, P.A.

(57) ABSTRACT

Guiding a leading vehicle according to a desired trailing vehicle path includes generating one or more proceeding paths for one or more intermediate locations along an implement train between a trailing vehicle first location and a leading vehicle second location. The proceeding paths generated with a propagation and transformation algorithm that propagates a preceding path of one of the first location, such as the desired trailing vehicle path, or one of one or more intermediate locations to an immediately proceeding location, and transforms the preceding path according to dimensional characteristics of the implement train. A second guiding path is generated for the leading vehicle second location with the algorithm based on the immediately preceding path of the intermediate location closest to the second location. The method facilitates guidance of the trailing vehicle along the desired trailing vehicle path without navigation markers on the implement train except for the leading vehicle.

28 Claims, 9 Drawing Sheets

(56) References Cited

U.S. PATENT DOCUMENTS

| | | | |
|---|---|---|---|
| 6,865,465 B2 | 3/2005 | McClure | |
| 7,054,731 B1 | 5/2006 | Lange et al. | |
| 7,147,241 B2 | 12/2006 | Beaujot et al. | |
| 7,162,348 B2 | 1/2007 | McClure et al. | |
| 7,373,231 B2 | 5/2008 | McClure et al. | |
| 7,383,114 B1 | 6/2008 | Lange et al. | |
| 7,460,942 B2 | 12/2008 | Mailer | |
| 7,490,678 B2 | 2/2009 | Unruh et al. | |
| 7,509,199 B2 | 3/2009 | Rekow | |
| 7,623,952 B2 | 11/2009 | Unruh et al. | |
| 7,860,628 B2 | 12/2010 | Lange | |
| 8,190,364 B2 | 5/2012 | Rekow | |
| 8,209,946 B2 * | 7/2012 | Neudorf et al. | 56/15.2 |
| 8,256,526 B2 | 9/2012 | Schmidt et al. | |
| 8,453,754 B2 | 6/2013 | Beaujot | |
| 8,469,114 B1 | 6/2013 | Borkgren | |
| 8,577,558 B2 | 11/2013 | Mitchell | |
| 8,583,315 B2 | 11/2013 | Whitehead et al. | |
| 8,594,879 B2 | 11/2013 | Roberge et al. | |
| 8,639,416 B2 | 1/2014 | Jones et al. | |
| 8,668,024 B2 | 3/2014 | Beaujot | |
| 2001/0018638 A1 | 8/2001 | Quincke | |
| 2007/0119332 A1 * | 5/2007 | Henderson | 104/307 |
| 2008/0147282 A1 | 6/2008 | Kormann | |
| 2012/0240546 A1 | 9/2012 | Kormann | |
| 2012/0253625 A1 | 10/2012 | Canuto et al. | |
| 2012/0261146 A1 | 10/2012 | Bolten | |
| 2012/0283909 A1 | 11/2012 | Dix | |
| 2013/0110358 A1 | 5/2013 | Merx et al. | |
| 2013/0168113 A1 | 7/2013 | Gustafson | |
| 2013/0173116 A1 | 7/2013 | Gustafson et al. | |
| 2013/0186657 A1 | 7/2013 | Kormann et al. | |

OTHER PUBLICATIONS

Lechner, Wolfgang, et al., "Global Navigation Satellite Systems", Computers and Electronics in Agriculture, 25(2000), [online]. Retrieved from the Internet: <URL: http://oldwww.phys.washington.edu/users/jeff/courses/588A/presentationfiles/dolmstead111209references/Global%20Navigation%20satellite%20systems.pdf>, (2000), 67-85.

Van Zuydam, R. P, "Centimeter-Precision Guidance Of Agricultural Implements In The Open Field By Means Of Real Time Kinematic Dgps", Proceedings of the Fourth International Conference on Precision Agriculture, (1999), 1023-1034.

* cited by examiner

| ARRAY LOCATIONS (CORRESPONDING TO POINTS i=1 TO i+10 ALONG RESPECTIVE PATHS FOR LOCATIONS OF INTEREST) | UNIT DIRECTION VECTORS AT POINTS ALONG EACH PATH | | | |
|---|---|---|---|---|
| | DTV REAR HITCH LOCATION (AT THE POINTS ALONG THE FIRST DESIRED PATH) | DTV FRONT HITCH LOCATION/LV REAR HITCH LOCATION (AT THE POINTS ALONG A FIRST PROCEEDING PATH) | TV FRONT HITCH LOCATION/LV REAR HITCH LOCATION (AT THE POINTS ALONG A SECOND PROCEEDING PATH) | LV FRONT HITCH LOCATION/ NAVIGATION SYSTEM REFERENCE (AT THE POINTS ALONG THE SECOND GUIDING PATH) |
| 1 | $UDV_1/FDP$ | $UDV_1/FPP$ | $UDV_1/SPP$ | $UDV_1/SGP$ |
| 2 | $UDV_2/FDP$ | $UDV_2/FPP$ | $UDV_2/SPP$ | $UDV_2/SGP$ |
| 3 | $UDV_3/FDP$ | $UDV_3/FPP$ | $UDV_3/SPP$ | $UDV_3/SGP$ |
| 4 | $UDV_4/FDP$ | $UDV_4/FPP$ | $UDV_4/SPP$ | $UDV_4/SGP$ |
| 5 | $UDV_5/FDP$ | $UDV_5/FPP$ | $UDV_5/SPP$ | $UDV_5/SGP$ |
| 6 | $UDV_6/FDP$ | $UDV_6/FPP$ | $UDV_6/SPP$ | $UDV_6/SGP$ |
| 7 | $UDV_7/FDP$ | $UDV_7/FPP$ | $UDV_7/SPP$ | $UDV_7/SGP$ |
| 8 | $UDV_8/FDP$ | $UDV_8/FPP$ | $UDV_8/SPP$ | $UDV_8/SGP$ |
| 9 | $UDV_9/FDP$ | $UDV_9/FPP$ | $UDV_9/SPP$ | $UDV_9/SGP$ |
| 10 | $UDV_{10}/FDP$ | $UDV_{10}/FPP$ | $UDV_{10}/SPP$ | $UDV_{10}/SGP$ |
| i+10 | $UDV_{i+10}/FDP$ | $UDV_{i+10}/FPP$ | $UDV_{i+10}/SPP$ | $UDV_{i+10}/SGP$ |

* "i" EQUALS THE DECIMATED POINT ALONG THE FIRST DESIRED PATH, AND THE CORRESPONDING POINTS FOR THE FIRST AND SECOND PROCEEDING PATHS (INTERMEDIATE PATHS) AND THE SECOND GUIDING PATH.
* "FDP" EQUALS THE FIRST DESIRED PATH OF THE REAR HITCH LOCATION OF THE DESIGNATED TRAILING VEHICLE.
* "FPP" EQUALS THE FIRST PROCEEDING PATH IMMEDIATELY PROCEEDING THE FIRST DESIRED PATH.
* "SPP" EQUALS THE SECOND PROCEEDING PATH IMMEDIATELY PROCEEDING THE FIRST PROCEEDING PATH.
* "SGP" EQUALS THE SECOND GUIDING PATH OF THE FRONT HITCH LOCATION OF THE LEADING VEHICLE IMMEDIATELY PROCEEDING THE SECOND PROCEEDING PATH.

FIG. 8

VEHICLE GUIDANCE BASED ON TRACTOR POSITION

CROSS-REFERENCE TO RELATED PATENT DOCUMENTS

This patent application is also related to SYSTEM AND METHOD FOR DETERMINING IMPLEMENT TRAIN POSITION, filed on the even date herewith.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S. Dak. All Rights Reserved.

TECHNICAL FIELD

This document pertains generally, but not by way of limitation, to guidance of a vehicle of an implement train.

BACKGROUND

Implement trains are a string of vehicles that are (generally) pulled by a leading vehicle. In one example, implement trains include agricultural equipment pulled by a leading vehicle (e.g., a tractor). For instance, implement trains may include one or more vehicles, such as wagons, carts, trailers, planters, fertilizers or the like. The vehicles of an implement train may have one or more fixed axles, one or more rotatable axles, and generally include a tongue and hitch to allow for the proximal and distal coupling of each of the vehicles with preceding and proceeding vehicles. An articulating joint is formed between each of the vehicles at the coupling between respective hitches and tongues.

In some examples, a GPS antenna is included on a planter, and coulters are used to steer the planter independently from the prime mover. In other examples, implement trains include GPS antennas on a planter and on the leading vehicle (e.g., a tractor or other prime mover). A controller integrates the GPS locations of both the leading vehicle and the planter to synthesize a route the leading vehicle may follow for guidance of the planter. However, this system requires GPS antennas on more than one of the vehicles of the implement train with the attendant maintenance and installation of the same.

OVERVIEW

The present inventor has recognized, among other things, that a problem to be solved can include the accurate guidance of a designated trailing vehicle of an implement train along a desired path by a leading vehicle of the implement train.

An implement train includes one or more articulated joints between the leading vehicle and the designated trailing vehicle. Accordingly, as the leading vehicle turns along a desired path the designated trailing vehicle will follow a path different from the desired path because of the articulating joints (and rotating axles where included in the trailing vehicle). In this manner, the designated trailing vehicle (e.g., a cart, wagon, planter, fertilizer or the like) may seed, apply an agricultural product or the like to a portion of a field away from a desired path based on the differing path of the designated vehicle relative to the desired path of the leading vehicle.

In an example, the present subject matter can provide a solution to this problem, such as by determining a first desired path for the designated trailing vehicle (e.g., according to the dimension of a field, road or the like) and then generating a second guiding path for a leading vehicle configured to guide the designated trailing vehicle along the first desired path. In one example, the present subject matter estimates a position of the designated trailing vehicle along the desired path (e.g., the first desired path) and successively estimates the location of preceding vehicles of the implement train until the corresponding location (e.g., the second guiding path) of the leading vehicle is generated. A series of locations along the first desired path of the designated trailing vehicle accordingly generates a series of locations for the leading vehicle. This series of locations forms the second guiding path. Guidance of the leading vehicle along the second guiding path correspondingly guides the designated trailing vehicle along the first desired path.

The present subject matter is configured to use an existing GPS navigation system for an available leading vehicle (e.g., tractor, tank, truck or the like) to guide trailing vehicles of an implement train. The trailing vehicles do not need separate GPS antennas. Instead, a control module in communication with the GPS navigation system maintains the dimensional information and configuration of the trailing implements (e.g., axles, hitch and tongue length from the axles, pivot locations and the like) and accordingly generates the second guiding path for the leading vehicle from the first desired path of the trailing implement. Optionally, the second guiding path is generated in real time according to the first desired path for the trailing vehicle or may be pregenerated based on a mapped route through terrain (e.g., a field).

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 8 is a table showing one example of an array of direction unit vectors for a plurality of locations along an implement train.

DETAILED DESCRIPTION

Figure 1A:
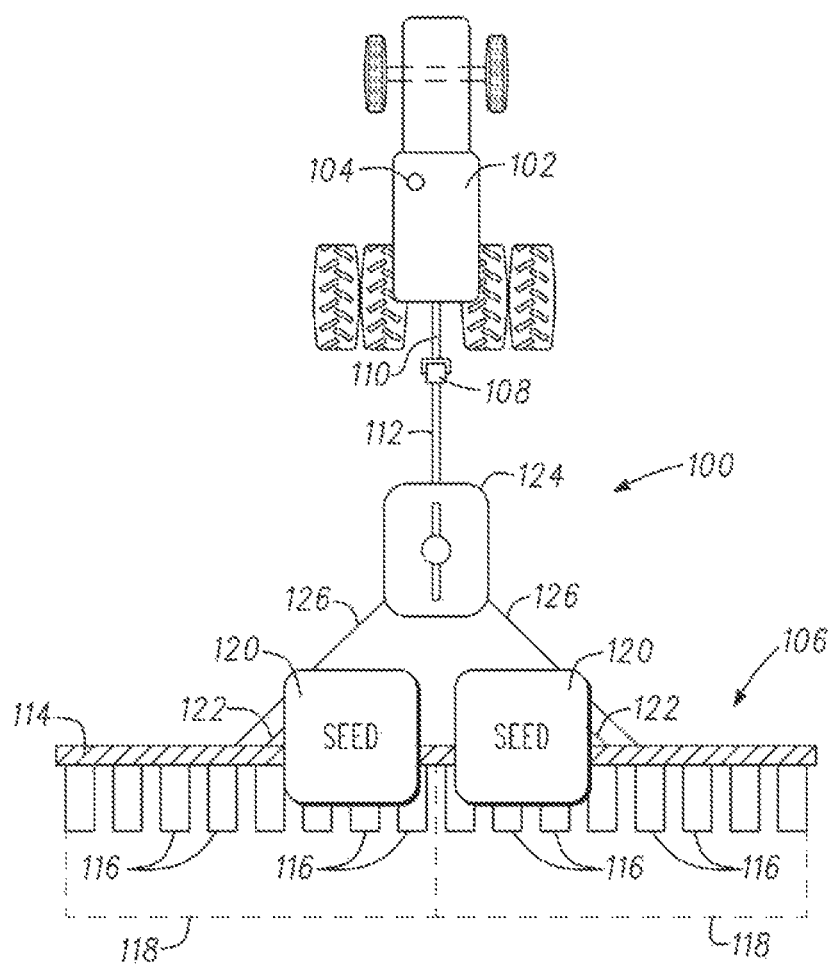
FIG. 1A is a schematic view of one example of an implement train including a leading vehicle, and one or more trailing vehicles.

FIG. 1 illustrates an implement train 100 comprising a leading vehicle 102 (e.g., a tractor or the like), with a navigation system sensor 104, such as a GPS antenna, mounted thereon. The leading vehicle 102 is operatively hitched to a trailing vehicle 106 (in one example a designated trailing vehicle as discussed herein) by way of an articulating joint 108 (e.g., a first articulating joint) that couples a rear hitch 110 of the leading vehicle 102 with a tongue 112 (front hitch) of the trailing vehicle 106. The trailing vehicle 106 (e.g., an agricultural implement) includes, but is not limited to, a toolbar 114 adapted to deliver one or more of granular or liquid products, such as seed, fertilizer and chemicals, to an agricultural field by way of a plurality of row units 116 (product dispensers) positioned and spaced apart along the width of toolbar 114. The toolbar 114 and the row units 116 are illustrated with broken lines as comprising right and left sides 118. In one example, the left and right sides 118 are individually controllable. In another example, each of the row units 116 is individually controllable.

As shown in FIG. 1, one or more seed containers 120 are mounted on the trailing vehicle 106 and are in operative connection with the row units through a seed supply line 122. A fertilizer container 124 is operatively connected to the row units 116 by one or more fertilizer supply lines 126. The implement train 100 is shown in this example with a single trailing vehicle 106. In other examples provided herein the implement train 100 includes one or more trailing vehicles operatively hitched as a train through coupling at one or more articulated joints between respective hitches and tongues.

There is difficulty ensuring that the trailing vehicle 106 of the implement train 100 (and accordingly the row units 116 thereon) is in the proper location within a field to provide one or more accurate seeding and product placement. The articulating joints, such as joint 108, curved paths and the like present a difficult linkage of pieces traveling in a non-linear fashion that frustrate the accurate guidance of the implement train to achieve a desired path for a trailing vehicle (e.g., a designated trailing vehicle of the implement train 100). Optionally, navigation sensors (e.g., GPS antennas) placed on one or more of the trailing vehicles can be used in concert with monitoring of the trailing vehicle locations to guide the leading vehicle. The installation and duplication of GPS antennas on multiple implements is labor intensive and expensive. Additionally, controllers capable of monitoring the trailing vehicle and adjusting a leading vehicle path according to the monitored trailing vehicle add additional expense and software and hardware to provide this type of control. The present disclosure addresses this problem by generating a second guiding path for a leading vehicle based on a first desired path of the trailing vehicle. The actual position of the trailing vehicle is not known. In contrast, a first desired path for the trailing vehicle is known, and then information about the first desired path and dimensional characteristics of the implement train 100 between each of two or more locations of interest along the train (e.g., hitch points, joints and the like) are used to propagate the first desired path through the implement train 100 and transform the path into the second guiding path for the leading vehicle 102.

GPS antennas and real time information about the trailing vehicle location, direction and the like are not needed. Accordingly, GPS antennas and other position and speed sensors for the trailing vehicles are not needed to accurately guide the trailing vehicle along the first desired path. Instead, by virtue of knowing the first desired path for the vehicle a second guiding path is generated for the leading vehicle. As the leading vehicle is guided along the second guiding path the trailing vehicle is correspondingly guided along the first desired path automatically.

Figure 1B:
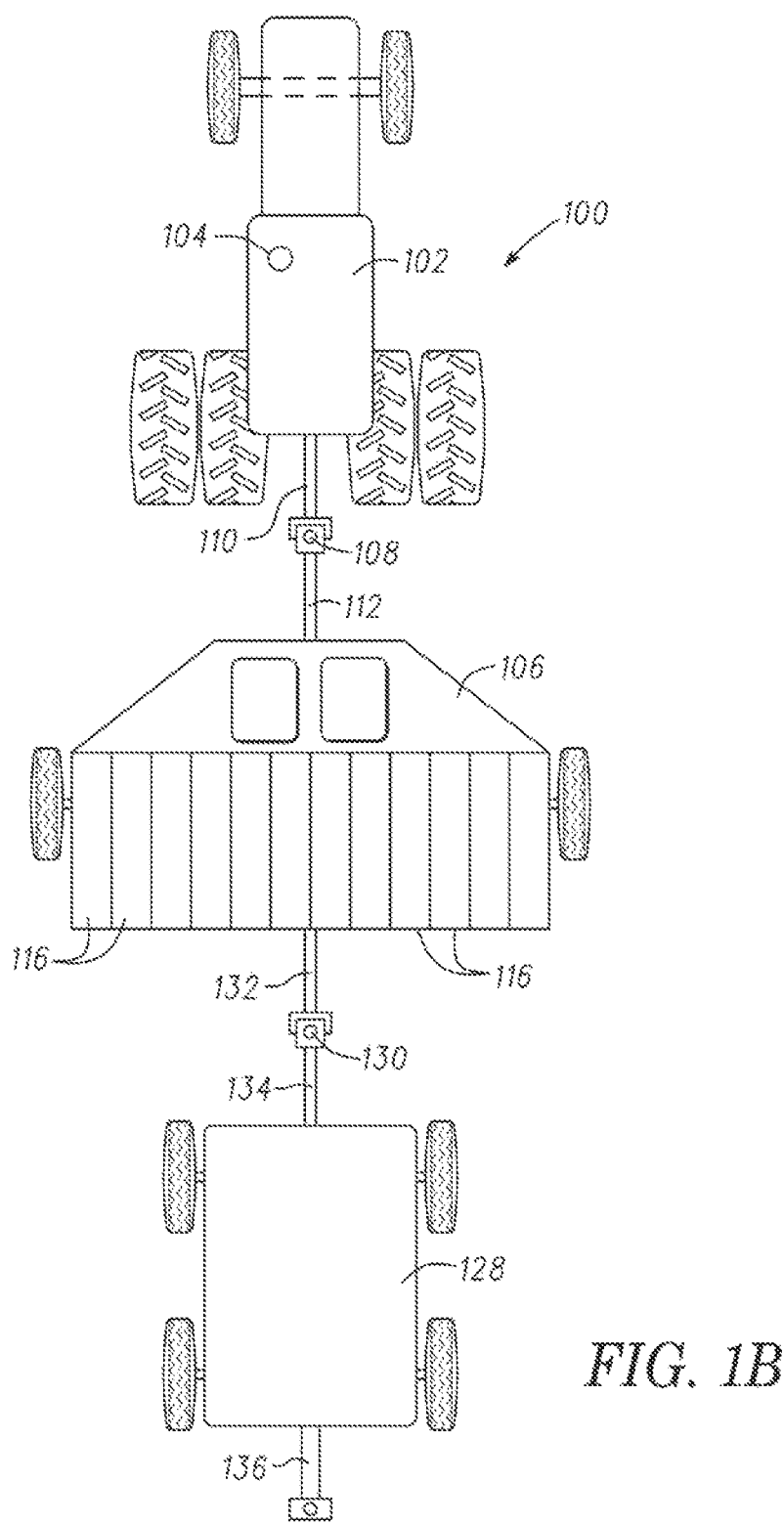
FIG. 1B is a schematic view of another example of an implement train including a plurality of trailing vehicles.

FIG. 1B shows another example of the implement train 100 having a plurality of trailing vehicles 106, 128 (e.g., two or more trailing vehicles) coupled with the leading vehicle 102. In the example shown, the second trailing vehicle 128 is coupled with the first trailing vehicle 106 at an articulating joint 130. As shown, the first trailing vehicle 106 includes a first trailing vehicle rear hitch 132 coupled with a second trailing vehicle tongue 134 (e.g., a second trailing vehicle front hitch) at the articulating joint 130. Additionally, in the example shown the second trailing vehicle 128 includes a second trailing vehicle rear hitch 136. As will be described herein, in one example, the first desired path for a designated trailing vehicle corresponds to the first desired path for the rear hitch of one trailing vehicle of the implement train 100, for instance the second trailing vehicle rear hitch 136. As discussed above, and discussed in detail herein, the present disclosure generates a second guiding path for a leading vehicle (for instance the second trailing vehicle 128 of the implement train 100) based on a first desired path of the trailing vehicle. Information about the first desired path of the trailing vehicle 128 and dimensional characteristics of the implement train 100 between each of two or more locations of interest along the train (e.g., hitch points, joints and the like) are used to propagate the first desired path through the implement train 100 (including each of the trailing vehicles, e.g., 106, 128) and transform the path into the second guiding path for the leading vehicle 102.

As discussed above, FIG. 1B shows the implement train 100 in a coupled configuration with the leading vehicle 102 coupled with a first trailing vehicle 106, and the first trailing vehicle 106 is coupled with a second trailing vehicle 128. As previously described, the vehicles of the implement train 100 are coupled at one or more articulating joints, such as the articulating joint 108 between the leading and first trailing vehicles 102, 106 and the articulating joint 130 between the first trailing vehicle 106 and the second trailing vehicle 128.

Figure 2:
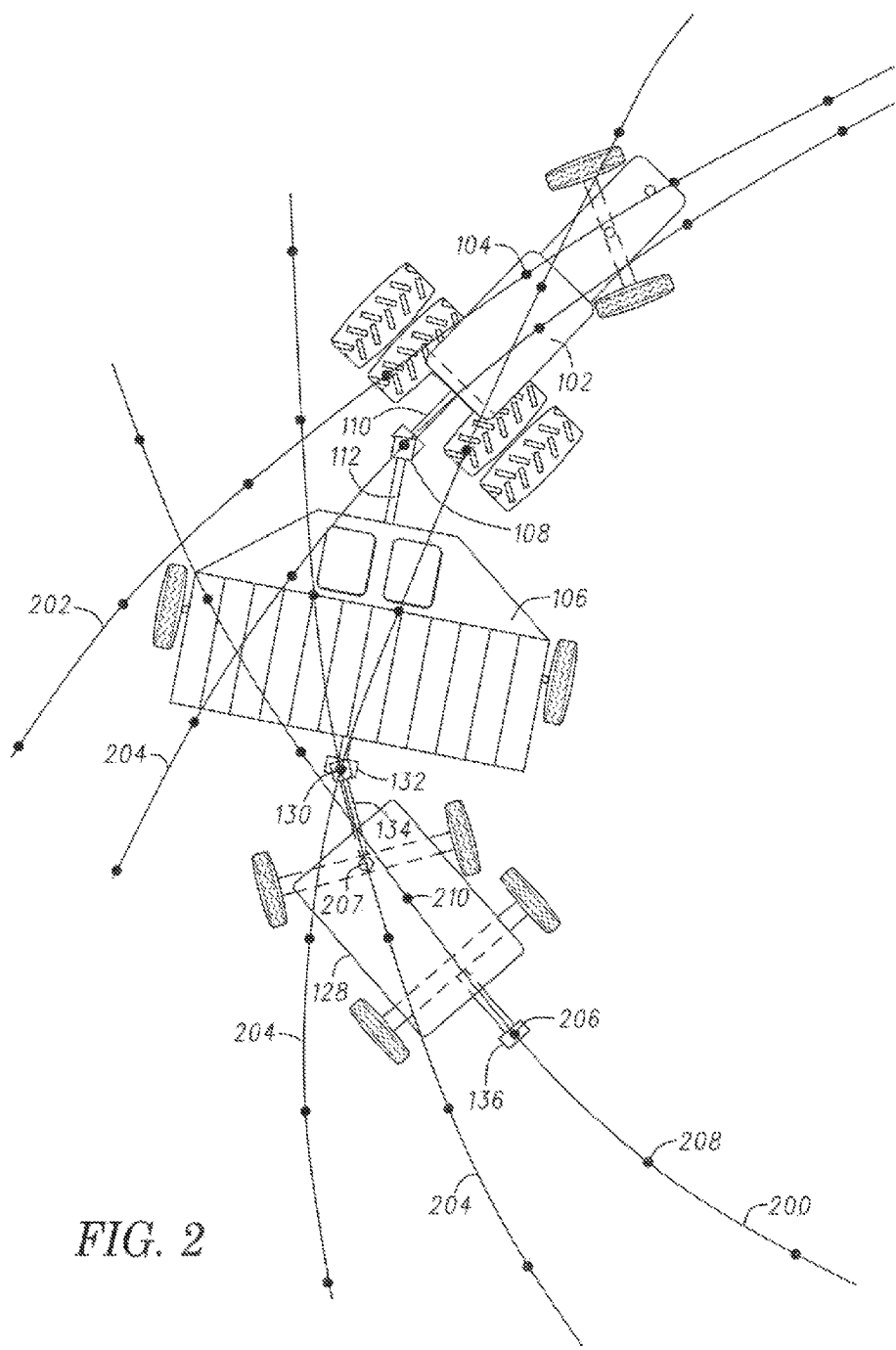
FIG. 2 is a schematic view of the implement train of FIG. 1 including a trailing vehicle following a curved first desired path.

FIG. 2 shows the implement train 100 as the implement train is traversing along a path, for instance, a curved path as shown in FIG. 2. The leading vehicle 102 is turning as it progresses forward correspondingly pulling and turning the trailing vehicles 106, 128 behind it. As previously discussed herein, the first and second trailing vehicles 106, 128 are coupled with the leading vehicle 102, for instance, by way of articulating joints such as the articulating joints 108, 130 shown in FIG. 2. Each of the trailing vehicles 106, 128 turns while following the leading vehicle 102 according to the dimensions of the respective vehicle as well as the configuration of the vehicle, for instance dependent upon the respective vehicles having one or more rotatable (pivoting along a vertical axis) axles, rotatable relative to the remainder of the trailing vehicle or the like.

As shown in FIG. 2, because of the dimensional variations of the vehicles, the differences in configuration of the trailing vehicles 106, 128 as well as their trailing positions behind the leading vehicle 102 each of the trailing vehicles 106, for instance, one or more locations along the trailing vehicles 106, 128 follows different paths than the curved path of the leading vehicle 102 such as a tractor. Accordingly, as an operator moves the leading vehicle 102 across terrain for instance through a field and along a curved path the trailing vehicles 106, 128 necessarily move along differing paths when following the curved path of the leading vehicle 102. The predictability of the position and heading of the trailing vehicles 106, 128 is made difficult by the articulating joints 108, 130 between each of the trailing vehicles 106, 128 and the leading vehicle 102 as well as the dimensional variations and configuration variations of each of the vehicles 106, 128. For instance, as shown in FIG. 2 the second trailing vehicle 128 (a designated trailing vehicle in one example) follows a first desired path 200. The first desired path 200 is represented by at least three, but typically many more samples of position points including for instance an instant point 206 corresponding to the present location of the rear hitch location 136 of the second trailing vehicle 128 and one or more preceding and proceeding points 208, 210. Additionally, other locations of interest of the second trailing vehicle 128 include the position of rotation of the axle of the trailing vehicle 128 (an axle pivot point 207) as well as the tongue 134 of the trailing vehicle 128 that ends at a front hitch location 130 (e.g., the articulating joint). The paths as shown in FIG. 2 are demonstrative and not necessarily drawn to scale. The curvature of the paths, the headings and orientations of each of the vehicles 102, 106, 128 are schematic in nature and exaggerated for demonstration purposes.

In a similar manner, locations of interest for the first trailing vehicle 106 include the rear hitch location 130 (corresponding to the articulating joint) and the tongue 112 having a front hitch location (corresponding to the articulating joint 108) coupled with the leading vehicle 102. As shown in FIG. 2, one or more intermediate paths 204 are shown drawn through each of those locations of interest along the implement train 100. As further shown in FIG. 2, each of these intermediate paths 204 differ from one another and also differ from the first desired path 200.

Referring again to FIG. 2, the leading vehicle front hitch location 104 includes a navigation system sensor at a set location on the leading vehicle, such as a GPS antenna. The front hitch location is shown moving along a second guided path 202. As will be described in detail, with the method and system provided herein guidance of the leading vehicle 102 along the second guiding path 202 correspondingly and automatically guides the designated trailing vehicle such as the second trailing vehicle 128 along the first desired path 200, for instance the rear hitch location 136 of the second trailing vehicle 128 follows the first desired path 200. That is to say, with knowledge of the desired path 200 for the second trailing vehicle 128, through the application of a propagation and transformation algorithm the second guiding path 202 is generated that accordingly allows for guidance of the second trailing vehicle 128 along the first desired path 200 while the leading vehicle 102 follows the second guided path 202. In one example, the second guiding path 202 is determined from the first desired path 200, for instance by propagating the first desired path 200 through one or more locations of interest along the implement train 100 and accordingly transforming the original path 200 to one or more intermediate paths 204 at each of those locations.

In the example shown in FIG. 2, the intermediate paths 204 correspond to the propagated first desired path 200 that has been transformed according to the algorithm described herein. As these intermediate paths 204 are generated, for instance by propagation on a point by point basis or as lines in general their respective paths 204 are propagated forward to the next location of interest where the algorithm is repeated again for the new location of interest to develop the proceeding path. After a series of proceeding paths are progressively developed along the implement train 100 toward the first hitch location, for instance the navigation system sensor 104 (a GPS antenna in one example), a second guiding path 202 is generated again by propagation of the preceding intermediate path 204 such as the intermediate path 204 associated with the articulating joint 108 at the rear hitch 110 of the leading vehicle 102. This intermediate path 204 is propagated to the navigation system sensor 104 and transformed according to the dimensional characteristics intervening between the preceding location of interest (the articulating joint 108) and the proceeding location of interest (the GPS antenna 104). By generating the second guided path 202 as extending through the navigation system sensor 104 an operator is able to follow the generated path 202 to thereby ensure that the designated trailing vehicle 128 correspondingly follows the first desired path 200 for instance extending through the rear hitch location 136 shown in FIG. 2.

Figure 3:
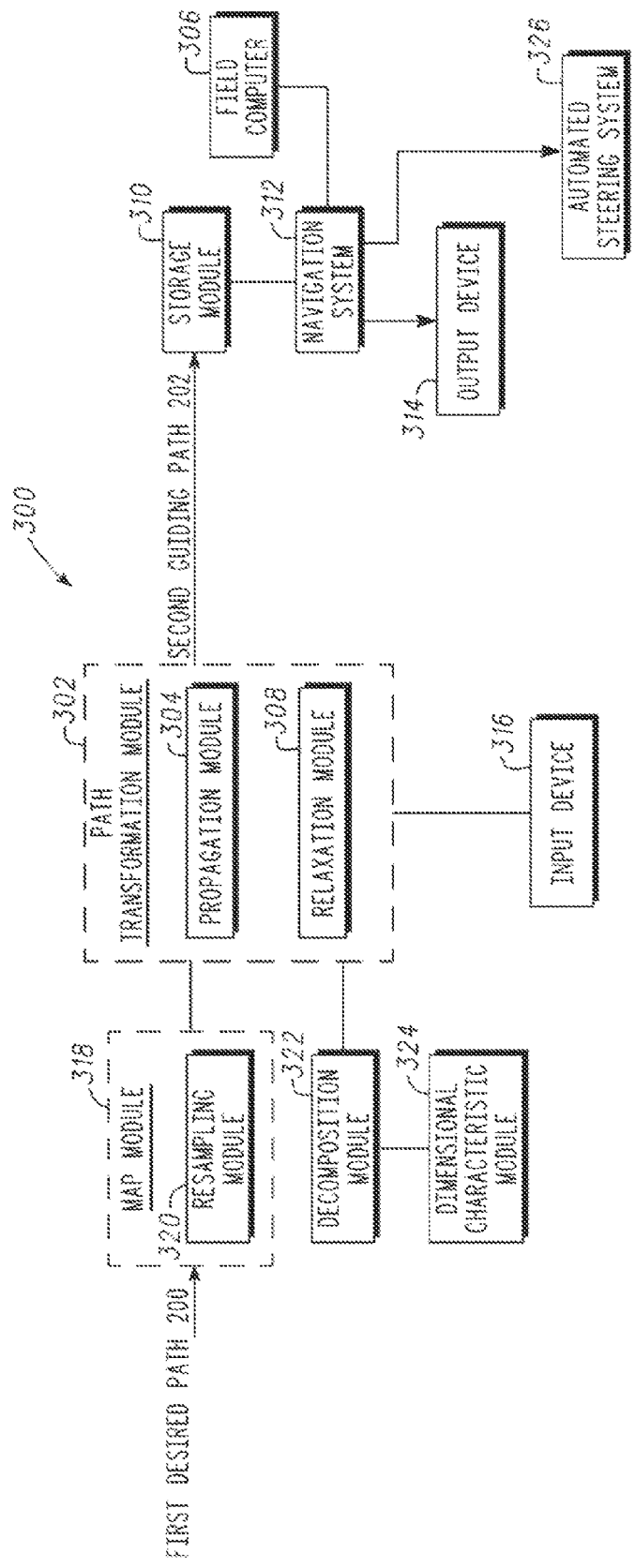
FIG. 3 is a schematic of a control system configured to generate a guidance path for the leading vehicle that guides a trailing implement along a desired path.

FIG. 3 shows one example of a control system 300 for guiding a leading vehicle, such as the leading vehicle 102 of the implement train 100 according to a desired trailing vehicle path, such as the trailing vehicle 128 shown in FIG. 1B. In one example, the desired trailing vehicle follows a first desired path 200 shown in FIG. 2 (and provided as an input in FIG. 3) and the leading vehicle 102 follows a second guided path 202 (provided as an output in FIG. 3) configured to ensure that the trailing vehicle 128 follows the first desired path. Referring now to FIG. 3, the control system 300 includes a map module 318. In one example, the map module 318 receives the first desired path 200 as an input, such as the desired path 200 shown in FIG. 2 for the rear hitch location of the designated trailing vehicle 128. Optionally, the map module 318 receives the first desired path by way of an input device such as keyboard, disk drive, universal serial bus port or the like. In another example, the map module 318 receives the first desired path by way of wireless communication for instance by wireless network, a satellite link or the like.

Referring again to FIG. 3, in another example the control system 300 includes a dimensional characteristic module 324. The dimensional characteristic module 324 includes the dimensional characteristics for each of the vehicles of the implement train 100. For instance, the dimensional characteristic module 324 includes the positional relationships of one or more of the locations of interest of the implement train 100, including, but not limited to each of the hitch locations, a distance between the hitch locations, and the corresponding ordering of the vehicles within the implement train 100. As shown in FIG. 2 in one example the implement train 100 includes one or more locations of interest including the rear hitch location of the designated trailing vehicle 128 (corresponding to the rear hitch 136 shown in FIG. 2) the front hitch location of the leading vehicle for instance a navigation system sensor 104 shown in FIG. 2 and one or more intermediate locations along the implement train between the rear and front hitch locations. As shown for instance in FIG. 2, the one or more intermediate locations are positioned along one or more intermediate paths 204. For instance, the one or more intermediate locations include one or more articulating joints between the trailing vehicles and the leading vehicle 106, 128, 102 as well as points of articulation present within the trailing vehicles such as the pivot axis 207 of an axle of the designated trailing vehicle 128.

Optionally, the dimensional characteristic module 324 is in communication with a decomposition module 322. As will be described herein in detail, in one example the control system 300 uses the dimensional characteristics of each of the vehicles in the implement train 100 to break down or decompose the components of the implement train into a plurality of carts having front and rear hitch locations as well as a single axle. In one example, the decomposition module 322 cooperates with the dimensional characteristic module 324 to readily decompose each of the vehicles of the implement train 100 into a plurality of carts as described herein. The decomposed vehicles are thereafter used in combination with the dimensional characteristic values contained within the dimensional characteristic module 324 to accordingly generate the second guiding path 202 from the first desired path 200 based on the operation of the path transformation module as described herein (e.g., through generation of one or more proceeding paths and eventual generation of the second guiding path 202).

A path transformation module 302 is further shown in FIG. 3 as part of the control system 300. Optionally, the path transformation module 302 is included in the field computer 306 (e.g., a computer provided with the leading vehicle 102 or provided elsewhere, for instance local or remote to the field and implement train 100. The path transformation module 302 is configured to generate the second guiding path (such as the second guiding path 202 shown in FIG. 2) for a front hitch location 104 of the leading vehicle 102. As shown in FIG. 3, the path transformation module 302 generates the second guiding path 202 as an output. As previously described, the second guiding path 202 is based on the first desired path 200 of the trailing vehicle 128. The path transformation module 302 includes a propagation module 304 in communication with the dimensional characteristic and map modules 324, 318. The propagation module 304 is configured to propagate and transform a preceding path to a proceeding path (e.g., transform one or more points along the preceding path to one or more corresponding points along the proceeding path). The preceding path includes one or more of the first desired path 200 and one or more intermediate paths 204 associated with each of the respective one or more intermediate locations of the implement train 100. Similarly, the proceeding path includes one or more of the intermediate paths 204 and the second guiding path 202 proceeding one or more of the earlier paths of the implement train 100.

Several options for the control system 300 follow. In one example, the path transformation module 302 includes a relaxation module 308. The relaxation module 308 relaxes the second guiding path 202 based on jitter originating in the first desired path 200. Stated another way, the relaxation module 308 relaxes or smooths the second guiding path 202 to ensure the leading vehicle 102 is readily able to follow the second guiding path 202.

In another example, the map module 318 includes a resampling module 320 configured to decimate the first desired path 200. In one example, decimation of the first desired path 200 corresponds to the generation of the series of discrete points along the first desired path 200 for instance at an interval of between 1 to 3 meters, for instance 2 meters between each of the discrete points. Optionally, the resampling module 320 is configured to perform one or more of decimation (subtracting points from a path) or interpolation (adding points to a path). In one example, the resampling module 320 decimates a path where the path has a series of otherwise closely positioned points, for instance along a tight radius turn (e.g., concave). In another example, the resampling module 320 interpolates a path where the path has a series of significantly spaced points (e.g., greater than 3 meters apart), for instance along a relatively straight path or a wide radius (convex) turn.

In another example, the control system 300 includes a storage module 310 in communication with the path transformation module 302. The storage module 310 is configured to store a plurality of points (e.g., to infer curvature as shown in the paths 200, 202, 204 and further to propagate points forward to proceeding paths), for instance decimated points of the first desired path 200 as well as an array of points corresponding to related points of each of the intermediate paths 204 as well as the second guiding path 202 that correspond to the discrete points of the first desired path 200. In another example, the storage module 310 is configured to store the second guiding path 202 output from the path transformation module 302 for use with the navigation system 312 to assist in guiding of the leading vehicle 102 along the second guiding path 202. In one example, the storage module 310 stores the complete second guiding path 202 generated from a complete first desired path 200. In another example, the storage module 310 receives and stores each of the discrete points of the second guiding path 202 as they are generated by the path transformation module 302. Stated another way, in one example the storage module 310 and the path transformation module 302 cooperate to generate and store points of the second guiding path 202 as the implement train 100 travels along the second guiding path 202 for instance proceeding (forthcoming points). In another example, the storage module 310 and the path transformation module 302 cooperate to generate and store the complete second guiding path 202 before the leading vehicle 102 and the remainder of the implement train 100 move along the second guiding path 202.

As previously described above, in one example, the control system 300 includes a navigation system 312 in communication with the path transformation module 302. The navigation system 312 is configured for coupling at the front hitch location of the leading vehicle 102, for instance a reference point at a position along the leading vehicle 102 (not necessarily the actual front hitch location). In another example, the navigation system 312 receives the second guiding path 202 generated by the path transformation module 302 (and optionally stored in the storage module 310). The navigation system 312 is thereby able to cooperate with GPS positioning or other navigation systems to provide a guided path for an operator of the leading vehicle 102 to follow (for instance by way of an output device 314 such as a monitor, acoustical cues or the like). For instance, in one example, the navigation system 312 cooperates with the path transformation module 302 (or a field computer 306 having the path transformation module 302 or that receives the second guiding path 202) to measure deviation from the second guiding path 202 generated by the path transformation module 302. As the leading vehicle 102 deviates from the second guiding path 202 the navigation system 312 notes the deviation and provides an alert to the operator, for instance, through the output device 314 thereby allowing the operator to bring the leading vehicle 102 back onto the second guiding path 202 and further ensure the designated trailing vehicle 128 follows the first desired path 200 shown in FIG. 2. In still another example, the navigation system 312 automatically adjusts the direction of the leading vehicle 102 to follow the second guiding path 202 (e.g., with an automated steering system 326 in communication with the navigation system 312).

In another example, the control system 300 includes a vector module (e.g., as part of a general purpose computer associated with the control system 300, the general computer configured to conduct the vector analysis described herein). The vector module is in communication with the propagation module 304. In an example, the path transformation module 302 is configured to generate direction unit vectors. Direction unit vectors correspond (are associated with) with one or more of the points, for instance decimated points along the first desired path 200. Additionally, corresponding direction unit vectors are similarly associated with points along the second guiding path as well as the one or more intermediate paths 204 shown in FIG. 2. As will be described herein, the direction unit vectors at each of these points are used to determine the heading and location of each of the vehicles of the implement train 100 and thereby accordingly assist in the generation of the second guiding path 202 based upon the vectors associated with each of the points of the first desired path 200.

Figure 4:
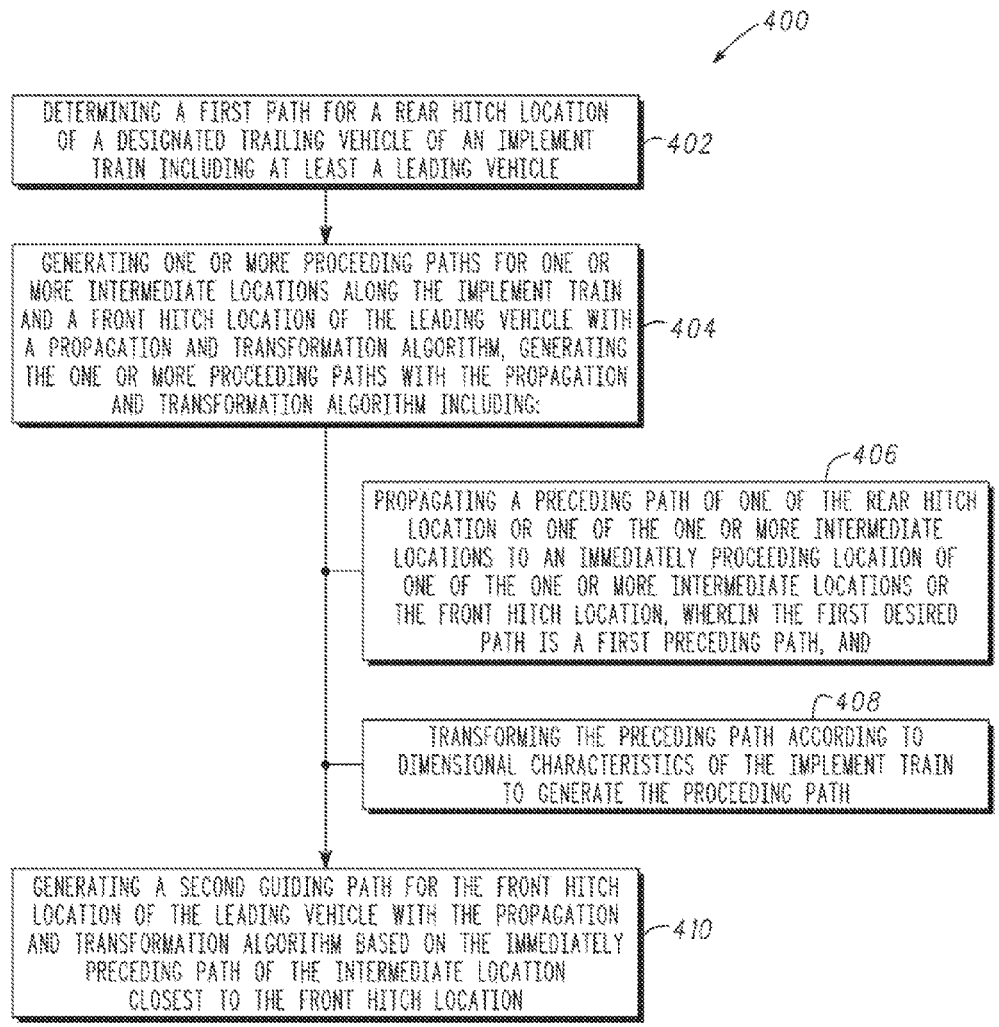
FIG. 4 is a block diagram showing one example of a method for estimating a guidance path of the leading vehicle based on the desired path of the designated trailing vehicle.

FIG. 4 shows one example of a method 400 for guiding a leading vehicle according to a desired trailing vehicle path. In describing the method 400, reference is made to one or more components features, functions, steps and the like described herein. Where convenient, reference is made to the components, features, steps, functions and the like with reference numerals. Reference numerals provided are exemplary and are not exclusive. For instance, the features, components, functions, steps and the like described in the method 400 include but are not limited to the corresponding numbered elements, other corresponding features described herein (both numbered and unnumbered), as well as their equivalence.

At 402, the method 400 includes determining a first desired path such as the path 200 shown in FIG. 2 for a rear hitch location 136 of a designated trailing vehicle 128 of an implement train 100 including at least a leading vehicle, such as the leading vehicle 102. In another example, the first desired path corresponds to a path at one or more features or locations of a designated trailing vehicle such as the vehicles 106 or 128 of the implement train 100. In one example, the first desired path corresponds to a mapped out route for the designated trailing vehicle, for instance across an agricultural field. In another example, the first desired path includes but is not limited to an overland route, an urban route, for instance, around buildings, along streets and the like. As will be described herein, the method 400 is configured to generate a second guiding path for the leading vehicle 102 that when followed by the leading vehicle correspondingly moves the designated trailing vehicle 128 along the first desired path 200 automatically and without navigation sensors or the like provided on the designated trailing vehicle 128 or any of the intervening trailing vehicles (such as the vehicle 106). Instead, a navigation system sensor is applied at a location of interest on the leading vehicle 102 for instance at the location corresponding to reference numeral 104 as shown in FIGS. 2 and 1B (a virtual front hitch location).

At 404, the method 400 includes generating one or more proceeding paths for one or more intermediate locations along the implement train 100 and a front hitch location, such as the front hitch location 104 corresponding to the navigation system sensor shown in FIGS. 1A and 1B of the leading vehicle 102, with a propagation and transformation algorithm. Generating the one or more proceeding paths with the propagation and transformation algorithm includes (at 406) propagating a preceding path of one of the rear hitch location 136 or of the one or more intermediate path locations 207, 130, 108 and the like to an immediately proceeding location of one of the one or more intermediate locations or the front hitch location 104. The first desired path 200 is in one example a first preceding path from which the proceeding paths are generated.

At 408, the propagation and transformation algorithm transforms the preceding path according to the intervening dimensional characteristics of the implement train 100 to generate the proceeding path. For instance, in one example, the intervening dimensional characteristics include those dimensional characteristics of the implement train 100 between adjacent locations of interest. As shown in FIG. 2, the intervening dimensional characteristics for the designating trailing vehicle 128 between the rear hitch location 136 and the proceeding location of interest 207 correspond to the dimensions between the rear hitch location and the pivot point 207 of the front axle of the designated trailing vehicle 128. In a similar manner the intervening dimensional characteristics for other vehicles such as the leading vehicle 102 include the dimensions between the rear hitch location (corresponding to the articulating joint 108 of the rear hitch 110) to the front hitch location, such as the location 104 corresponding to the position of the navigation system sensor on the leading vehicle 102. In another example, intervening dimensional characteristics of the leading vehicle 102 are measured from between the articulating joint 108 (again corresponding to the rear hitch location of the leading vehicle 102) to another location of the leading vehicle 102 for instance an actual front hitch location or any location on the leading vehicle 102 corresponding to a navigation system sensor, such as a GPS antenna.

At 410, the method 400 includes generating a second guiding path 202 for the front hitch location of the leading vehicle 102 with the propagation and transformation algorithm based on the immediately preceding path of the intermediate location closest to the front hitch location such as the articulating joint 108 corresponding to the rear hitch location of the rear hitch 110. Stated another way the second guiding path 202 is in one example generated by repeating the application of the propagation and transformation algorithm with the preceding intermediate location corresponding to the articulating joint 108 by propagating the path 204 corresponding to that location to the front hitch location 104 corresponding to the navigation system sensor and then transforming the intermediate path 204 (the immediately preceding path) to generate the second guiding path 202.

Accordingly, as shown in FIG. 2 the first desired path 200 is propagated and gradually transformed through shifting of the path to each of the intermediate locations and generation of corresponding intermediate paths 204. The second guiding path 202 is based on the intermediate paths and the original first desired path 200 and accordingly provides a guiding path that allows the leading vehicle 102, when following the second guiding path 202, to correspondingly guide and move the designated trailing vehicle 128 along the first desired path automatically and without navigation information provided regarding the designated trailing vehicle.

Several options for the method 400 follow. In one example, generating one or more proceeding paths for one or more intermediate locations along the implement train 100 and the front hitch location 104 of the leading vehicle 102 includes repeating generation of the one or more proceeding paths for each of the one or more intermediate locations and a front trailing hitch with the propagation and transformation algorithm based on the respective immediately preceding path. Stated another way, as discussed above the propagation and transformation algorithm is repeatedly applied for each proceeding point along the implement train 100 to generate corresponding proceeding paths based on the path that preceded it, for instance the first intermediate path 204 corresponding to the pivot axis 207 of the designated trailing vehicle 128 is generated by propagation of the first desired path 200 and transformation of that path as described herein to form the intermediate path 204. Similarly, the proceeding intermediate paths 204, associated with the second articulating joint 130 and the first articulating joint 108 are similarly generated from the immediately respective preceding paths through application of the propagation and transformation algorithm. This process is again repeated with the intermediate path 204 corresponding to the articulating joint 108 to thereby generate the second guiding path 202. With the generation of the second guiding path 202 and outputting of the second guiding path, for instance through an output device in communication with a navigation system, the designated trailing vehicle 128 is automatically guided along the first desired path 200 as the leading vehicle 102 is guided along the second guiding path 202. That is to say, even without navigation systems or antennas positioned on either of the trailing vehicles 106, 128, with the propagation and transformation algorithm, guidance of the leading vehicle 102 along the second guiding path 202 will automatically guide the designated trailing vehicle 128 for instance the rear hitch location 136 along the first desired path 200.

In another example, the method 400 includes generating the second guiding path 202 entirely prior to moving the leading vehicle 112 along the second guided path 202. Stated another way, the second guiding path 202 is generated from a pre-plotted first desired path 200 plotted over a field, terrain or the like prior to actual movement of the leading vehicle 102 across that terrain. In another example, the second guiding path 202 is generated while the leading vehicle 102 is moving on the second guide path 202. That is to say, each of the points or direction unit vectors for decimated locations of the second guiding path 202 are in one example gradually generated according to the first desired path 200 as the leading vehicle 102 progresses over the terrain in question. Accordingly the second guiding path 202 in such an example may be adjusted according to changes in the first desired path 200 as the leading vehicle 102 traverses the terrain.

In another example, determining the first desired path 200 for the rear hitch location 136 of the designating trailing vehicle 128 (where optionally another location of another trailing vehicle such as the trailing vehicle 106) includes generating an instant direction unit vector for an instant point 206 of a series of respective discrete points on the first desired path 200 based on one or more of a preceding point 208 and a proceeding point 210 of the rear hitch location 136 relative to the instant point 206 in question. Stated another way, the first desired path 200 is decimated into a series of discrete points for instance having a distance between each of the points between 1 and 3 meters, for instance 1 meter. As will be described herein, in one example cords (vectors, corresponding to the distance and direction between each of the discrete points) extend between the preceding point 208, the instant point 206 as well as the proceeding point 210 along the desired path (see FIG. 2). Direction unit vectors are derived from these cords and accordingly applied to the points along the first desired path 200. For instance, the direction unit vector associated with the instant point 206 corresponds to derived values from the cords extending between the preceding point 208, the instant point 206 as well as a chord extending between the instant point 206 and the proceeding point 210. These direction unit vectors are in one example generated for each of the decimated points on the first desired path 200 and are propagated and transformed through each of the intermediate paths 204 and finally are propagated and transformed to generate the second guiding path 202 as shown in FIG. 2.

In another example, the method 400 includes relaxing the second guiding path 202 generated for instance by way of direction unit vectors based on corresponding points (direction unit vectors associated with points) of the originating first desired path 200. Relaxing the second guiding path 202 attenuates the effect of side-to-side jitter developed in any of the paths 200, 202, 204. In one example, jitter as used herein is the short-term irregular side-to-side variation in the position points that make up a path, whether the first desired path 200 or the second guiding path 202. Jitter may exist in the first desired path 200 due to a component of random motion of a vehicle whose path was stored for later use by the disclosure (e.g., one of the modules described herein). In another example, jitter may exist in the first desired path because of, but not limited by, errors in the computation of a desired path by a swathing algorithm, or by the quantization error inherent in the digital representation of a stored path. Optionally, jitter may also occur in the longitudinal component of the stored first desired path 200. In one example, the disclosed algorithm is largely insensitive to jitter in the longitudinal component of the path.

In still another example, the method 400 includes decomposing each vehicle of the implement train 100 into component vehicles. In one example, each of the component vehicles includes a respective component single axle, a component rear hitch and a component front hitch location. That is to say, with the second trailing vehicle 128 shown in FIG. 2 the vehicle 128 is split into two component vehicles, each of the component vehicles having front and rear component hitch locations as well as a component axis.

Figure 5A:
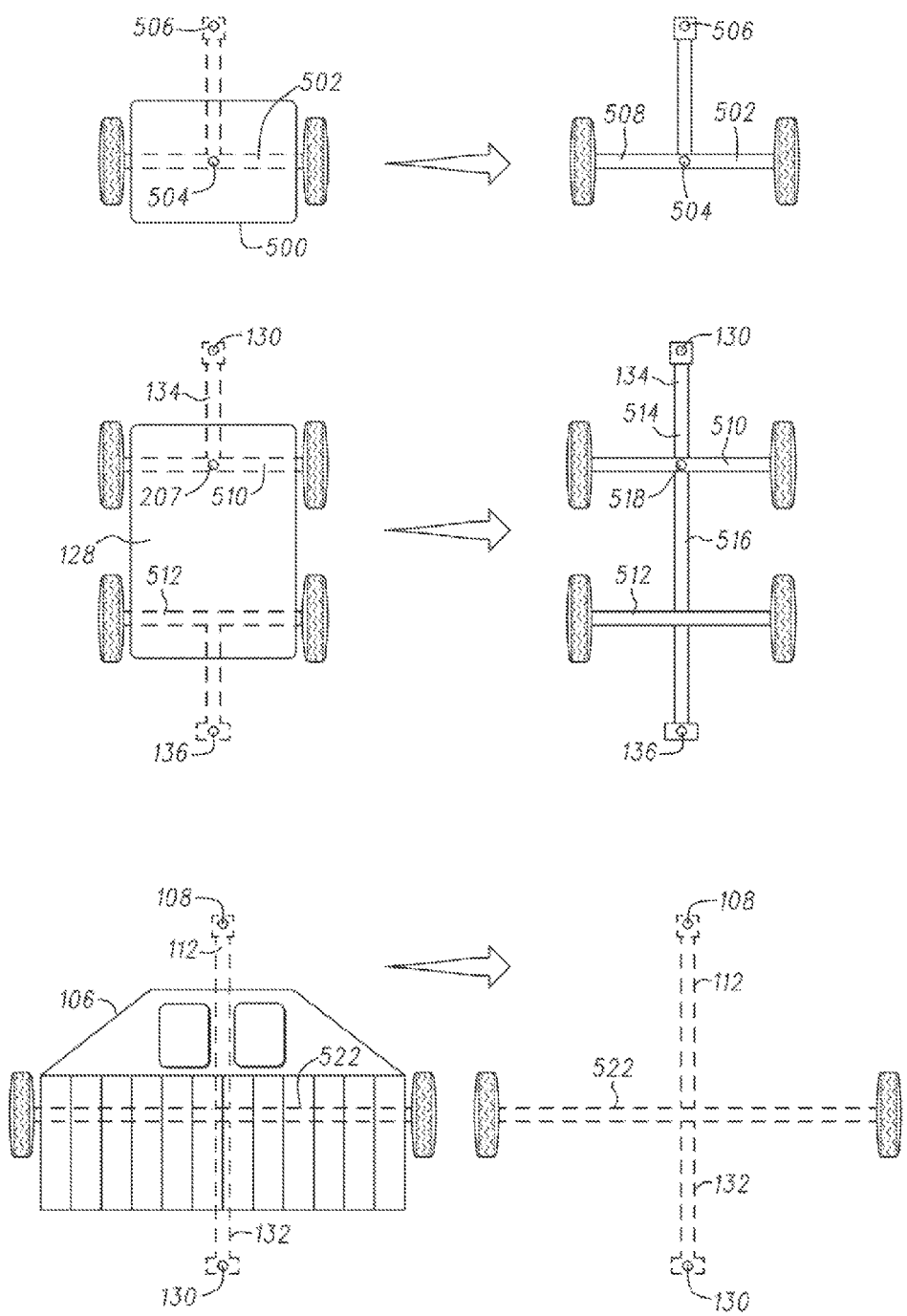
FIG. 5A is a schematic view showing the decomposition of a plurality of vehicles of an implement train.

FIG. 5A shows a series of trailing vehicles such as the trailing vehicles 500, 128 and 106 (trailing vehicles 106 and 128 are previously described and shown in FIGS. 1A and 1B). FIG. 5A decomposes each of these trailing vehicles into respective component vehicles for use in the propagation and transformation algorithm previously described herein. Each of the one or more vehicles are decomposed into component vehicles having respective axes and front and rear hitch locations. For instance, in the first example of the trailing vehicle 500 the trailing vehicle includes an axle 502 and rear and front hitch locations 504, 506 respectively. The rear and front hitch locations 504, 506 are shown at either end of a tongue for instance extending from the axle 502. In the view to the right of the non-decomposed vehicle 500 the decomposed vehicle or component vehicle 508 is shown again corresponding to the trailing vehicle 500. The component vehicle 508 again includes the axle 502 as well as the rear and front hitch locations 504, 506.

In a similar manner, the trailing vehicle 106 (previously shown in FIGS. 1A, B) is decomposed in FIG. 5A. For instance, the trailing vehicle 106 includes front and rear hitch locations corresponding to the articulating joints 108, 130 or couplings for articulating joints with the other components of the implement train 100. As shown in FIG. 5A, the decomposed component vehicle further includes a corresponding tongue 112 positioning the articulating joint 108 (for instance the front hitch location 108) of the trailing vehicle 106 away from the axle 522 and the rear hitch 132 positions the articulating joint 130 (the rear hitch location 130) from the axle 522. In each of these trailing vehicles 500, 106 the dimensions of the front and rear hitch locations relative to one another and optionally relative to the axles are included with the propagation and transformation algorithm to accordingly propagate and transform the preceding paths or points along the path to proceeding paths or points along the proceeding paths as described herein.

Another example of a trailing vehicle 128 is also provided in FIG. 5A. The trailing vehicle 128 is decomposed into first and second components vehicles 514, 516. For instance, the first and second component vehicles 514, 516 correspond to virtual representations of separate vehicles coupled together at the pivot point 207 for the axle 510. As shown in the view on the right the first component vehicle 514 includes the front axle 510 and the articulating joint 130 (component front hitch location) of the trailing vehicle 128 as well as a component rear hitch location 518 corresponding to the position of the pivot point 207 of the axle 510. The second component vehicle 516 of the decomposed trailing vehicle 128 includes a component front hitch location 520 corresponding to the location of the pivot point 207 of the front axle 510 of the first component vehicle 514. Similarly the second component vehicle 516 includes the rear hitch location 136 (the component rear hitch location of the component vehicle 516) spaced from the rear axle 512 of the second component vehicle 516. The trailing vehicle 128 is thereby decomposed into first and second component vehicles 514, 516 configured for coupling and articulation at the pivot point 207 of the trailing vehicle 128 corresponding to an articulating joint between the first and second component vehicles 514, 516.

Based on the exemplary decompositions shown in FIG. 5A, an implement train including any variety of trailing vehicles may be decomposed into separate component vehicles coupled at articulating joints corresponding to one or more pivoting axes or articulating joints of the respective trailing vehicles to thereby facilitate the propagation and transformation of preceding paths to proceeding paths including the eventual generation of the second guiding path 202.

Figure 5B:
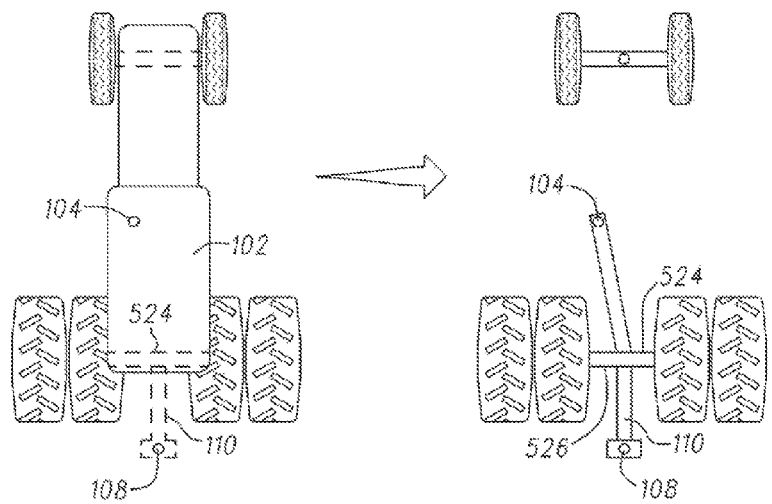
FIG. 5B is a schematic view showing the decomposition of a leading vehicle of an implement train.

Referring now to FIG. 5B, the leading vehicle 102 (e.g., a tractor) is shown in a decomposed format. As previously described, the leading vehicle 102 includes a rear hitch 110 including a coupling for the articulating joint 108 between the leading vehicle 102 and a trailing vehicle. In one example, the articulating joint 108 corresponds to a rear hitch location of the leading vehicle 102. As further shown in FIG. 5B and previously described herein, the leading vehicle 102 further includes a navigation sensor system 104, for instance a GPS antenna positioned at a desired location on the leading vehicle 102 (a virtual front hitch location). The right view of FIG. 5B shows the decomposed leading vehicle 526. The component leading vehicle 526 includes an axle 524. The rear hitch location 108 is shown extending from the axle 524 and the front hitch location, for instance corresponding to the navigation sensor system 104 such as a GPS antenna, extends from the axle 524 (a location corresponding to a leading end of the rear hitch 110). With the arrangement shown in FIG. 5B the component leading vehicle 526 provides a decomposed view that spaces the front hitch location 104 (e.g., navigation sensor system 104) from the rear hitch location corresponding to the articulating joint 108 by a predictable and set distance. In another example the navigation sensor system 104 is positioned substantially anywhere on the leading vehicle 102. Accordingly the navigation sensor system 104 (the front hitch location) in such an example would include a virtual bar or other virtual element extending from the navigation sensor system 104 to the corresponding portion of the axle 526 coupled with the rear hitch location such as the articulating joint 108 by way of the rear hatch 110.

Figure 6:
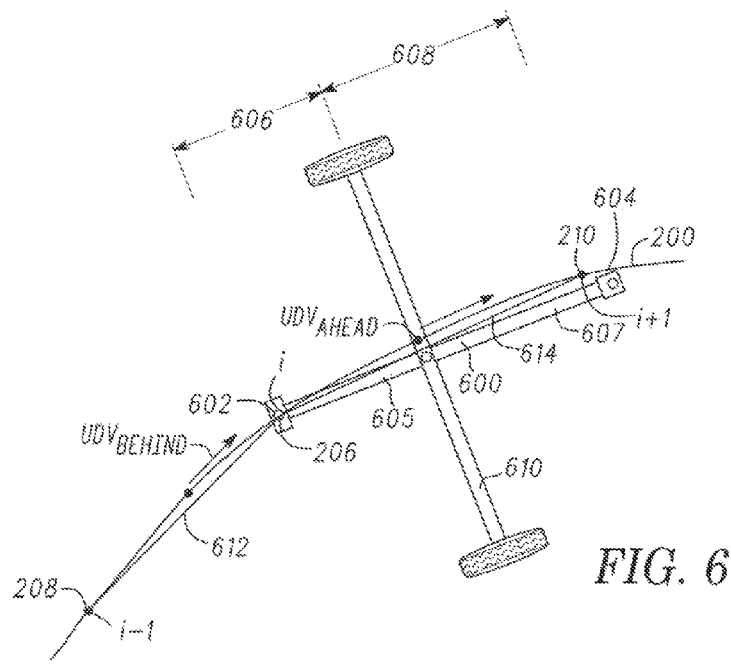
FIG. 6 is a schematic view of one example of the designated trailing vehicle having a rear hitch location following the first desired path.

FIG. 6 is a schematic example of a trailing vehicle 600 including rear and front hitch locations 602, 604, respectively. As shown in the Figure, the front hitch location 604 is spaced from an axle 610 by a tongue 607 having a tongue length 608. In a similar manner the rear hitch location 602 is spaced from the axle 610 by a rear hitch 605 having a rear hitch length 606. The rear hitch location 604 is shown at an instant point 206 (i) along the first desired path 200. Additional points including a preceding point 208 (i−1) and a proceeding point (i+1) are also shown along the first desired path 200.

A prophetic example of one type of propagation and transformation of the first desired path to one or more intermediate paths is provided herein. The propagation and transformation is repeated as described for each proceeding location of interest along the implement train 100 to determine the corresponding path of the proceeding location. Propagation and transformation of the proceeding paths continues until the final location (the front hitch location 104 of the leading vehicle 102) is reached. The propagation and transformation of the immediately preceding path before the front hitch location 104 (e.g., a rear hitch location of the leading vehicle corresponding to the articulated joint 108) generates the second guiding path 202 (the final proceeding path).

As discussed herein, direction unit vectors are determined for the rear hitch location 602 at each of a plurality of discrete points along the first desired path 200. The direction unit vectors are stored in an array and propagated forward toward the next location of interest in the implement train (e.g., the implement train 100) and transformed according to the intervening dimensional characteristics of a vehicle (in this example the trailing vehicle 600). In the example shown, the propagated direction unit vectors (e.g., the first desired path including a plurality of points corresponding to the collected direction unit vectors) are transformed according to the dimensions of the trailing vehicle between the rear and front hitch locations 602, 604, the rear hitch length 606 and the tongue length 608.

The propagation and transformation algorithm processes the first desired path 200 to generate a next path (e.g., an intermediate path) that is the path that the front hitch location 604 of the trailing cart 600 must follow for the rear hitch location 602 to follow the initial path. The methods described herein repeat the application of the propagation and transformation algorithm as a path-generation process, using each front hitch location path just produced as the rear hitch location path of the proceeding cart. Accordingly a front-hitch path (the second guiding path 202) for each vehicle of the implement train 100 is generated from each preceding rear-hitch path for the respective vehicle until a path for the front hitch location 104 of the leading cart 102 is generated. Guidance of the leading vehicle along the second guiding path 202 causes (guides) designated trailing vehicle rear hitch location (e.g., 602 or rear hitch location 136) to follow the first desired path 200 in the field.

In the prophetic example, each path (first desired path 200, intermediate paths 204 and second guiding path 202) is represented by a numbered list of two-dimensional radius vectors, or "points", in a Cartesian coordinate system. Each point in the list is given an index number one greater than that of the previous point (e.g., i−1, i, i+1 and the like).

For each point in a rear-hitch location path (the first desired path 200 for either of locations 136 or 602) the propagation and transformation algorithm produces a point in a corresponding front-hitch location path (the second guiding path 202 for the front hitch location 104), using the point under consideration (i), the points ahead and behind (i+1 and i−1), and the dimensional characteristics of the vehicle between each of the points under consideration. Because a triplet of points are used, the first and last rear-hitch points can produce no front-hitch points, thus reducing the number of path points by two as each cart is processed. This is not a problem given the large number of closely spaced points used and in any case may be compensated for by generating a longer initial path than otherwise specified. The propagation and transformation algorithm exploits the loss of a point at each iteration from path to path to write the front-hitch location path (the second guiding path 202) into the same memory from which it reads the rear-hitch location path (the first desired path 200 of the rear hitch location), by offsetting the front-hitch points by one point toward the beginning of the list of points. Stated another way, the result for point i (e.g., corresponding to the instant point 206 along the first desired path) is written into the location for point i−1 (corresponding to the preceding point 208).

To propagate and translate point i (e.g., the direction unit vector for point i) from the rear hitch location 602 (or 136 in FIGS. 1A-2) to the front hitch location 104 (and any optional intervening intermediate locations such as articulating joints, axle pivots and the like), the algorithm forms a first chord 612 (Chord Behind) between point i−1 and point I (208 and 206), and a second chord 614 (Chord Ahead) between point i and point i+1 (206 to 210) corresponding to the difference vectors between the radius-vector points.

Chord Behind=[i]−[i−1]

Chord Ahead=[i+1]−[i]

The directions of these difference vectors approximate the heading of the rear hitch location 602 at the midpoints of the chords, along the ideal curved path through the points. The algorithm also generates the chord lengths as the magnitudes of these vector differences, and also constructs unit vectors (direction unit vectors) from the chord vectors 612, 614 by dividing them by their respective magnitudes.

Distance Behind=Mag(Chord Behind)

Distance Ahead=Mag(Chord Ahead)

$$UDV_{Behind} = \frac{\text{Chord Behind}}{\text{Distance Behind}}$$

$$UDV_{Behind} = \frac{\text{Chord Behind}}{\text{Distance Behind}}$$

The algorithm then generates a direction rate of change (Rate of Direction Change) as a function of distance along the path by differencing the direction unit vectors and dividing by half the sum of the chord lengths (the distance between the origins of the direction unit vectors).

Direction Change=$UDC_{Ahead} - UDV_{Behind}$ $$\text{Rate of Direction Change} = \frac{\text{Direction Change}}{(\text{Distance Behind} + \text{Distance Ahead}/2)}$$

The algorithm generates the vehicle 600 heading (direction unit vector) of the rear hitch location 602 at point i by propagating the direction unit vector ($UDV_{Behind}$) of the chord vector 612 (Chord Behind) forward from the middle of the chord vector 612 to point i (the instant location of the rear hitch 602). The propagation of the direction unit vector of the chord vector 612 generates a direction unit vector at the point i for the first desired path 200, $UDV_{1+n/FDP}$, where i equal 1+n. The determination of the $UDV_{1/FDP}$ is repeated for each of the points along the first desired path 200 (generating $UDV_{1+n/FDP}$ direction unit vectors corresponding to each of the points). Accordingly, the first desired path 200 is represented in one example by a series of direction unit vectors (e.g., such as n total points) each generated from a triplet including the instant point, such as i, i+1, and the like as well as preceding and proceeding points (i−1 or i, and i+1 or i+2, respectively).

The algorithm propagates and transforms the direction unit vector of the rear hitch location 602 at point i to a proceeding location of interest corresponding to point i (e.g., the vehicle 600 front hitch location 604 along an intermediate path) in one example by first propagating the direction unit vector for the rear hitch location 602 at point i to the axle 610 of the vehicle 600, and then in a second step propagating and transforming the direction unit vector at the axle to the front hitch location 604.

For instance, the direction unit vector of the rear hitch location 602 at point i is equivalent to the $UDV_{Behind}$ plus the rate of direction change multiplied by half of the chord length (Distance Behind; from the middle of the chord to the rear hitch location 602). As stated previously, in another example, the algorithm propagates and transforms the direction unit vector of the rear hitch location 602 at point i ($UDV_{1/FDP}$; direction unit vector at point i=1 along the first desired path) to the front hitch location 604 in two steps. First, the algorithm transforms the preceeding direction unit vector of the rear hitch location 602 according to the propagation to the axle 610 by multiplying the vector rate of change (Rate of Direction Change) by the rear-hitch length 606, and adding this to the direction unit vector of the rear hitch location 602 at point i (e.g., the instant point 206). Because the axle is perpendicular to the direction of travel, the direction of travel at this point is also the direction of the longitudinal axis of the cart.

$$UDV_{1/FDP} = UDV_{Behind} + \text{Rate of Direction Change}\left(\frac{1}{2}\text{Distance Behind}\right)$$

$UDV_{1/Axle} = UDV_{1/FDP}$ +Rate of Direction Change (Rear Hitch Length)

Where:
$UDV_{1/FDP}$ is the Direction Unit Vector for the rear hitch location 602 at point i=1 along the first desired path 200.
$UDV_{1/Axle}$ is the Direction Unit Vector of the axle 610 at the intersection of the axle axis with the first desired path 200.

The algorithm then propagates and transforms the direction unit vector of the axle 610 to the front hitch location 604 ahead of the axle and offset laterally (from the point of intersection between the path and the axis of the axle) as may be specified by the vehicle 600 dimensions including the distance from the rear hitch location 602 to the front hitch location 604. The front hitch location 604 heading is already known and corresponds to the direction unit vector at the axle 610 (as discussed above this corresponds to the direction of the longitudinal axis of the cart). Accordingly, by propagating and transforming the direction unit vector of the axle 610 to the front hitch location 604 the location or origin of the direction unit vector for the front hitch location (corresponding to the axle 610 direction unit vector) is determined. The heading and location of the connected rear hitch location of a proceeding vehicle of the implement train 100 will be identical to that of the front hitch location. The process is then repeated again with the front hitch location (rear hitch location of the proceeding vehicle) direction unit vector to determine the direction unit vectors of locations on proceeding vehicles including eventually the leading vehicle 102.

In another example, one or more of the trailing vehicles of an implement train 100 is a steered wagon. The rear wheels of a steered wagon are steered to an angle equal but opposite from the front wheels. Accordingly, it is the middle of the wagon that is parallel to the direction of travel and not the rear axle that is perpendicular to the direction of travel. In this example the algorithm propagates the direction change (Rate of Direction Change) farther forward from the axle by half of the tongue length of the tongue length of the rear vehicle, that is, to the middle of the wagon.

As shown in the exemplary prophetic example it is not necessary that the algorithm generate all points of each path (e.g., 200, 202, 204) before computing points for a proceeding next path. In fact, any point of any of the paths (including the second guiding path 202) may be generated in any order as long as the three antecedent points of the preceding path are already available.

As discussed herein, the propagation and transformation is repeated as described for each proceeding location of interest along the implement train 100 to determine the corresponding path of the proceeding location (the intermediate paths 204 and the second guiding path 204 of the leading vehicle 102). Propagation and transformation of the proceeding paths continues until the final location (the front hitch location 104 of the leading vehicle 102) is reached. The propagation and transformation of the immediately preceding path before the front hitch location 104 (e.g., a rear hitch location of the leading vehicle corresponding to the articulated joint 108) generates the second guiding path 202 (the final proceeding path).

One example of an array of direction unit vectors for each of a plurality of locations of interest along an implement train is provided in FIG. 8. As shown, for each of the points i along the first desired path 202, the proceeding intermediate paths 204, and the second guiding path 204 corresponding to the points of the path 202 there is a respective direction unit vector for each of the locations of interest including rear hitch and front hitch locations of a designated trailing vehicle, rear and front hitch locations of an intermediate vehicle, and rear and front hitch locations of the leading vehicle. In one example, as the array is filed with preceding points (direction unit vectors) the corresponding proceeding points of paths closer to the leading vehicle are generated. Optionally, with the algorithm discussed herein, the array is filled with proceeding points as triplets of points are generated for a preceding path. As shown, the second guiding path 202 is generated from the propagated and transformed first desired path 200 through multiple steps in the array. Stated another way, the second guiding path 202 is generated as a series of direction unit vectors that form the second guiding path 202, and the direction unit vectors are based on the first desired path 200 for a designated trailing vehicle, the direction unit vectors generated from the first desired path 200 and the dimensional characteristics between adjacent locations of interest along the implement train 100.

It is also possible to compute paths in real time or in non-real time. In particular, the entire path for a vehicle is generated in advance and away from the vehicle and then supplied to the navigation and guidance system for a vehicle of the implement train 100 before any other action is taken, such as movement of the implement train.

In still another example, the second guiding path 202 is relaxed to attenuate jitter (e.g., side-to-side jitter) originating from the first desired path 200 and potentially amplified with application of the propagation and transformation algorithm. Stated another way, jitter in the first desired path 200, when amplified through the propagation and transformation is addressed to reduce hard-to-follow back and forth movement of the second guiding path 202 (wiggling) generated from the first desired path. In one example, an algorithm approximating a low-pass special filter is used to relax the second guiding path. In another example, a weighted sum is applied to each of the points, for instance to each of the triplet of points, to relax each of the actual points (direction unit vectors) of the second guiding path. For example, for $UDV_{3/SGP}$ the preceding and proceeding points are temporarily weighted by a value (e.g., 0.25) and the instant point, $UDV_{3/SGP}$ is temporarily weighted by another larger value (e.g., 0.5). $UDV_{3/SGP}$ is then given a new value corresponding to the sum of the temporary weighted values of the triplet of points including the instant point and its preceding and proceeding points. In this example, or with another low-pass spatial filter the second guiding path 202 is accordingly relaxed to address jitter found in the first desired path 200 and potentially amplified with application of the propagation and transformation algorithm. By addressing jitter steering demands on the leading vehicle 102 are lessened without having an appreciable effect on the second guiding path 202 that would affect guidance of the designated trailing vehicle along the first desired path 200.

Figure 7:
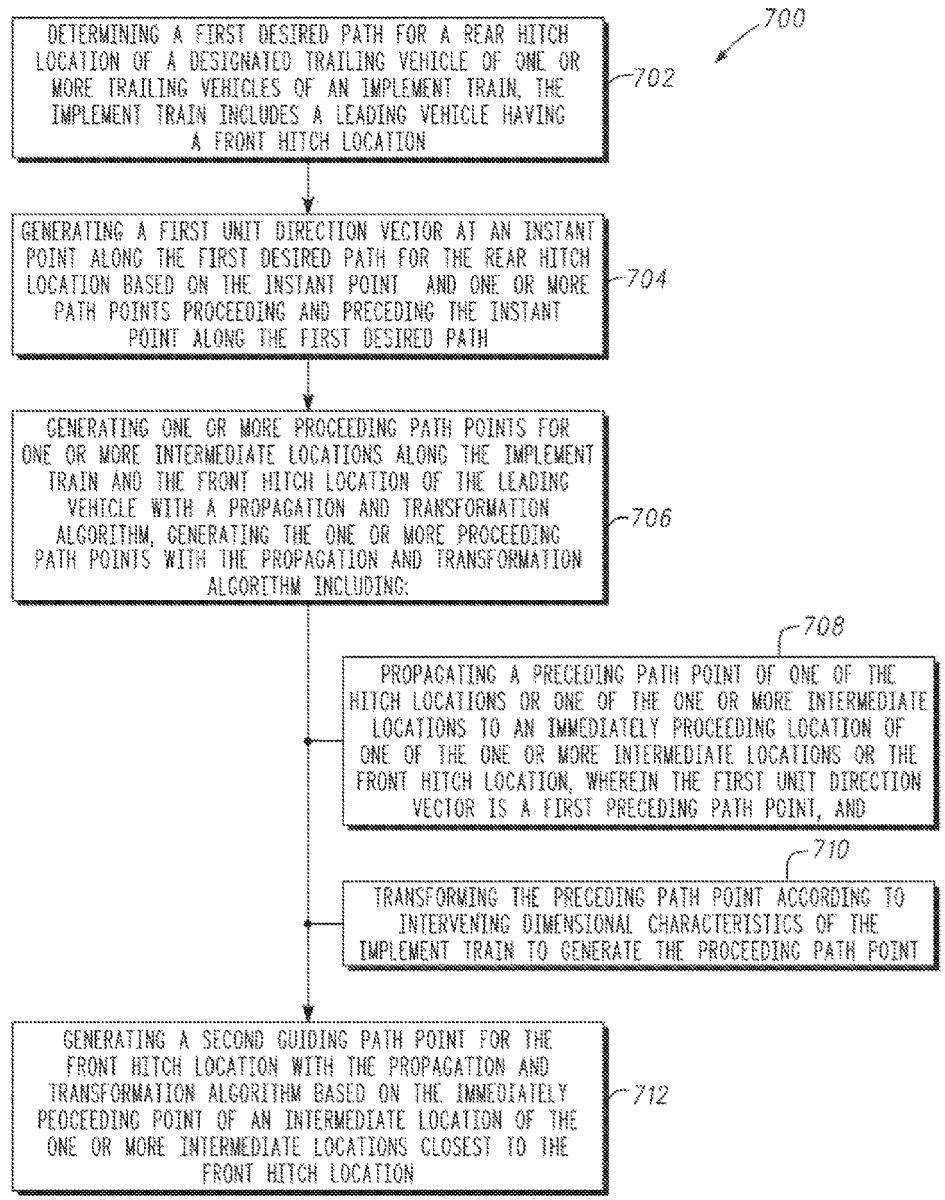
FIG. 7 is a block diagram showing another example of a method for estimating a guidance path of the leading vehicle based on the desired path of the designated trailing vehicle.

FIG. 7 shows one example of a method 700 for guiding a leading vehicle, such as the leading vehicle 102 (FIGS. 1A, B) according to a desired trailing vehicle path. In describing the method 700 reference is made to one or more components, features, functions, steps, and the like described herein. Where convenient, reference is made to the components, features, functions, steps, and the like with reference numerals. Reference numerals provided are exemplary and are not exclusive. For instance, the features, components, functions, steps, and the like described in the method 700 include but are not limited to the corresponding numbered elements, other corresponding features described herein (both numbered and unnumbered) as well as their equivalents.

At 702, the method 700 includes determining a first desired path 200 for a rear hitch location (such as location 602 or 136) of a designated trailing vehicle (128 or 600) of one or more trailing vehicles of an implement train 100. The implement train 100 includes a leading vehicle 102 having a front hitch location 104. In one example, the front hitch location is a virtual front hitch location corresponding to a navigation system sensor, for instance a GPS antenna. In another example, the implement train 100 includes a plurality of trailing vehicles. The method 700 propagates the first desired path for a designated trailing vehicle of the implement train 100 and transforms that path to eventually generate a second guiding path 202 as described herein.

At 704, a first direction unit vector is generated at an instant point (such as a point i) along the first desired path 202 for the rear hitch location (such as location 602 or 136) based on the instant point and one or more preceding and proceeding path points along the first desired path 200 (e.g., i-1 and i+1, respectively). At 706, one or more proceeding path points are generated for one or more intermediate locations such as articulating joints, pivoting axles and the like along the implement train 100 and the front hitch location 104 of the leading vehicle 102. The one or more preceding path points are generated with a propagation and transformation algorithm that generates the one or more proceeding path points with propagation and transformation of preceding path points (e.g., from preceding paths) as described herein.

For instance, at 708 the method 700 includes propagating a preceding path point of one of the rear hitch location or one of the one or more intermediate locations along one or more intermediate paths 204 to an immediately proceeding location of one of the one more intermediate locations (such as articulating joints, proceeding rear hitch locations, front hitch locations and the like or the concluding front hitch location 104 of the leading vehicle 102). The first direction unit vector, for instance of the instant point under consideration on the first desired path 200, is a first preceding path point of the series. At 710, propagation and transformation further includes transforming the preceding path point, such as the instant path point at location i along the first desired path according to intervening dimensional characteristics of the implement train 100 to generate the proceeding path point. In one example, where the location and heading of a front hitch location of a trailing vehicle are desired the preceding path point of the rear hitch location is used along with the intervening dimensional characteristics of the vehicle between the rear and front hitch locations to determine the proceeding path point for the front hitch location based on that preceding path point of the rear hitch location.

At 712, the method 700 includes generating a second guiding path point of the second guiding path 202 for the front hitch location 104 with the propagation and transformation algorithm as described herein and based on the immediately preceding path point of an intermediate location of the one or more intermediate locations (e.g., a rear hitch location of the leading vehicle 102) closest to the front hitch location 104. Stated another way, the propagation and transformation algorithm is in one example repeated for each of a series of corresponding points along each of the intermediate paths 204 to thereby propagate the first direction unit vector at the instant point along the first desired path 200 to generate a corresponding path point of the second guided path 202. In this manner the second guiding path 202 is gradually generated based on the repeated generation of direction unit vectors for a plurality of points positioned along the first desired path 200.

Several options for the method 700 follow. In one example and as discussed above, the method 700 includes repeating generation of both the one or more proceeding path points and the second guiding path point for a plurality of points along the first desired path 200. Repeated generation generates a corresponding plurality of second guiding path points (as well as intermediate path points) that form the second guiding path 202, such as an array of path points for each of the respective paths. Optionally, generation of the second guiding path 202 is completed prior to moving the leading vehicle 102 along the second guiding path. That is to say, the second guiding path 202 is generated from a pre-plotted first desired path 200. In still another example, generating the second guiding path 202 is conducted while the leading vehicle 102 is moved along the second guiding path 202. For instance a portion of the second guiding path is previously generated based on preceding previously generated points of the first desired path 200, and the method 700 is repeated to gradually generate more points along the second guiding path 202. Accordingly, the second guiding path 202 is generated in real-time or near real time as the first desired path 200 is determined.

In another example, generating both of the one or more proceeding path points and the second guiding path point as described above includes generation of corresponding direction unit vectors for each of those respective path points. Stated another way, as described in the method 700 a first direction unit vector is generated for the instant point 206 along the first desired path 200. In a similar manner, the propagation and transformation algorithm in one example generates direction unit vectors for each of the intermediate path points and the second guiding path points of the corresponding intermediate and second guiding paths. In yet another example, generating the first direction unit vector (as well as the other direction unit vectors described herein) includes determining rear and forward chord vectors respectively extending from a preceding point 208 on the first desired path 200 to the instant point 206 and from the instant point 206 to a proceeding point 210 on the first desired path 200. A change in direction (e.g., a rate of change of direction) is measured between the rear and forward cords and the first direction unit vector is associated to a rear hitch location based on one or more of the rear or forward chord vectors and the measured change in direction. In still another example, generating both of the one or more proceeding path points includes generating a designated trailing vehicle intermediate direction unit vector for an intermediate location (e.g., 130) on the designated trailing vehicle closer to the leading vehicle 102 than the rear hitch location (136 or 602). Generating the designated trailing vehicle intermediate direction unit vector includes combining the rear chord vector previously determined herein with a fraction of the change in direction (for instance a rate of change of direction) based on the distance from the rear hitch location to the intermediate location on the designating trailing vehicle (for instance an axle or front hitch location).

In one demonstrative example, the change in direction is used as follows to accordingly determine a direction vector at an instant point (e.g., point 206) and propagate the direction vector forward to an intermediate point within the implement train 100, for instance the pivot point 207 of the axle of the designated trailing vehicle 128. In the demonstrative example a vector rate of direction change with respect to distance along the first path 200 is generated between the midpoints of the arcs (between the respective points 206, 208, 210) to the rear and forward points 208, 210 from the instant point 206, for example, by differencing the direction unit vectors of the two chords 612, 614 and then dividing by the distance between the centers of the chords, that is, by half the sum of the chords' lengths or by half the distance between the preceding and following points. A direction unit vector at the instant point is generated, for example, by interpolation between the direction unit vectors of the chords 612, 614. The direction unit vectors approximate the directions of the path 200 midway along the arcs between the instant point 206 and the preceding or following point 208, 210. A direction unit vector for the designated trailing vehicle 128 is generated by multiplying the vector rate of direction change by the distance from the rear hitch 136, which is at the instant point 206, to the point on the vehicle that must be parallel to the path ahead. The wheels of a simple cart constrain the cart axle from any sidewise motion relative to the path accordingly the multiplier is the perpendicular distance of the rear hitch behind the axle. For a steered wagon, the steering mechanism constrains the center of the wagon body to travel parallel to the path and accordingly the multiplier is the perpendicular distance from the rear hitch to the axle plus half the perpendicular distance from the axle to the front hitch. The vector rate of change may for example be simply scaled by the multiplier, added to the direction unit vector at the instant point, and then renormalized because the angles of direction change may be expected to be small over the distances between consecutive path points. Once the direction of the vehicle is known, the location of its front hitch, which is the point sought in the intermediate path 204, is generated from the location of the rear hitch 136 and the known vehicle dimensions.

In still another example the method 700 includes guiding the leading vehicle 102 along the second guiding path 202 as generated herein. For instance, the second guiding path 202 is output through a navigation system for instance a monitor, aural communication device or the like in communication with a GPS antenna or sensor positioned at the front hitch location 104. With guiding of the leading vehicle 102 along the second guiding path 202 the designated trailing vehicle (128 or 600) is automatically guided along the first desired path 200 with guidance of the leading vehicle along the second guiding path 202. That is to say, by generating the second guiding path 202 with the propagation and transformation algorithm the guidance of the leading vehicle correspondingly results in the designated trailing vehicle following the first desired path 200. Optionally and as described herein, the designated trailing vehicle 600 or 128 follows the first desired path 200 while the leading vehicle 102 is the only vehicle of the implement train with a navigation system sensor. That is to say, the designating trailing vehicle and any of the implement train 100 vehicles aside from the leading vehicle 102 is without a navigation system sensor and with the propagation and transformation algorithm incorporated into the method 700 as described herein allows automatic guidance of the designated trailing vehicle along the first desired path 200, as described herein.

Various Notes & Examples

Example 1 can include subject matter such as a method for guiding a leading vehicle according to a desired trailing vehicle path, the method including determining a first desired path for a rear hitch location of a designated trailing vehicle of an implement train including at least the designated trailing vehicle and a leading vehicle; generating one or more proceeding paths for one or more intermediate locations along the implement train and a front hitch location of the leading vehicle with a propagation and transformation algorithm, generating the one or more proceeding paths with the propagation and transformation algorithm including: propagating a preceding path of one of the rear hitch location or one of the one or more intermediate locations to an immediately proceeding location of one of the one or more intermediate locations or the front hitch location, wherein the first desired path is a first preceding path, and transforming the preceding path according to intervening dimensional characteristics of the implement train to generate the proceeding path; and generating a second guiding path for the front hitch location of the leading vehicle with the propagation and transformation algorithm based on the immediately preceding path of the intermediate location closest to the front hitch location.

Example 2 can include, or can optionally be combined with the subject matter of Example 1, to optionally include wherein generating one or more proceeding paths for one or more intermediate locations along the implement train and a front hitch location of the leading vehicle includes repeating generation of the one or more proceeding paths for each of the one or more intermediate locations and the front trailing hitch with the propagation and transformation algorithm based on immediately preceding paths that respectively precede the one or more proceeding paths.

Example 3 can include, or can optionally be combined with the subject matter of one or any combination of Examples 1 or 2 to optionally include guiding the leading vehicle along the second guiding path, the second guiding path output through a navigation system at the front hitch location, and automatically guiding the designated trailing vehicle along the first desired path with guidance of the leading vehicle along the second guiding path.

Example 4 can include, or can optionally be combined with the subject matter of one or any combination of Examples 1 through 3 to optionally include wherein the leading vehicle is the only vehicle of the implement train with a navigation system sensor.

Example 5 can include, or can optionally be combined with the subject matter of one or any combination of Examples 1-4 to optionally include wherein the intervening dimensional characteristics of the implement train includes the dimensional characteristics between adjacent locations of the implement train including the rear hitch location of the designated trailing vehicle, the one or more intermediate locations and the front hitch location of the leading vehicle.

Example 6 can include, or can optionally be combined with the subject matter of Examples 1-5 to optionally include wherein generating the second guiding path is completed prior to moving the leading vehicle along the second guiding path.

Example 7 can include, or can optionally be combined with the subject matter of Examples 1-6 to optionally include wherein generating the second guiding path is conducted while moving the leading vehicle along the second guiding path.

Example 8 can include, or can optionally be combined with the subject matter of Examples 1-7 to optionally include wherein determining the first desired path for the rear hitch location of the designated trailing vehicle includes generating an instant direction unit vector of an instant point of respective discrete points along the first desired path based on the locations of one or more of a preceding point and a proceeding point of the respective discrete points relative to a location of the instant point.

Example 9 can include, or can optionally be combined with the subject matter of Examples 1-8 to optionally include relaxing the second guiding path based on jitter originating in the first desired path.

Example 10 can include, or can optionally be combined with the subject matter of Examples 1-9 to optionally include comprising decomposing each vehicle of the implement train into component vehicles, each of the component vehicles including a respective component single axle and respective component rear hitch and component front hitch locations.

Example 11 can include, or can optionally be combined with the subject matter of Examples 1-10 to optionally include wherein determining the first desired path includes decimating the first desired path into a plurality of discrete points along the first desired path.

Example 12 can include, or can optionally be combined with the subject matter of Examples 1-11 to optionally include a method for guiding a leading vehicle according to a desired trailing vehicle path, the method including determining a first desired path for a rear hitch location of a designated trailing vehicle of one or more trailing vehicles of an implement train, the implement train including a leading vehicle having a front hitch location; generating a first direction unit vector at an instant point along the first desired path for the rear hitch location based on the instant point and one or more path points proceeding and preceding the instant point along the first desired path; and generating one or more proceeding path points for one or more intermediate locations along the implement train and the front hitch location of the leading vehicle with a propagation and transformation algorithm, generating the one or more proceeding path points with propagation and transformation algorithm including: propagating a preceding path point of one of the rear hitch location or one of the one or more intermediate locations to an immediately proceeding location of one of the one or more intermediate locations or the front hitch location, wherein the first direction unit vector is a first preceding path point, and transforming the preceding path point according to intervening dimensional characteristics of the implement train to generate the proceeding path point; and generating a second guiding path point for the front hitch location with the propagation and transformation algorithm based on the immediately preceding path point of an intermediate location of the one or more intermediate locations closest to the front hitch location Example 13 can include, or can optionally be combined with the subject matter of Examples 1-12 to optionally include repeating generation of both of the one or more proceeding path points and the second guiding path point for a plurality of points along the first desired path, repeated generation generating a corresponding plurality of second guiding path points that form a second guiding path.

Example 14 can include, or can optionally be combined with the subject matter of Examples 1-13 to optionally include wherein generating the second guiding path is completed prior to moving the leading vehicle along the second guiding path.

Example 15 can include, or can optionally be combined with the subject matter of Examples 1-14 to optionally include wherein generating the second guiding path is conducted while moving the leading vehicle along the second guiding path.

Example 16 can include, or can optionally be combined with the subject matter of Examples 1-15 to optionally include wherein generating both of the one or more proceeding path points and the second guiding path point includes generation of corresponding direction unit vectors.

Example 17 can include, or can optionally be combined with the subject matter of Examples 1-16 to optionally include wherein generating the first direction unit vector includes: determining rear and forward chord vectors respectively extending from a preceding point on the first desired path to the instant point and from the instant point to a proceeding point on the first desired path, measuring a change in direction between the rear and forward chords, associating the first direction unit vector to the rear hitch location based on one of the rear or forward chord vectors and the measured change in direction.

Example 18 can include, or can optionally be combined with the subject matter of Examples 1-17 to optionally include wherein generating both of the one or more proceeding path points includes generating a designated trailing vehicle intermediate direction unit vector for an intermediate location on the designated trailing vehicle closer to the leading vehicle than the rear hitch location, generating the designated trailing vehicle intermediate direction unit vector including combining the rear chord vector with a fraction of the change in direction based on the distance from the rear hitch location to the intermediate location on the designated trailing vehicle.

Example 19 can include, or can optionally be combined with the subject matter of Examples 1-18 to optionally include guiding the leading vehicle along the second guiding path, the second guiding path output through a navigation system at front hitch location, and automatically guiding the designated trailing vehicle along the first desired path with guidance of the leading vehicle along the second guiding path.

Example 20 can include, or can optionally be combined with the subject matter of Examples 1-19 to optionally include wherein the leading vehicle is the only vehicle of the implement train with a navigation system sensor.

Example 21 can include, or can optionally be combined with the subject matter of Examples 1-20 to optionally include a system for guiding a leading vehicle according to a desired trailing vehicle path including: a map module including a first desired path for a rear hitch location of a designated trailing vehicle of an implement train including a leading vehicle; a dimensional characteristic module including dimensional characteristics for each of the vehicles of the implement train, the rear hitch location of the designated trailing vehicle, the front hitch location of the leading vehicle and one or more intermediate locations between the rear and front hitch locations; a path transformation module configured to generate a second guiding path for a front hitch location of a leading vehicle based on the first desired path, wherein the designated trailing vehicle automatically follows the first desired path where the leading vehicle follows the second guiding path, the path transformation module includes: a propagation module in communication with the dimensional characteristic and the map modules, the propagation module configured to propagate and transform a preceding path to a proceeding path, the preceding path includes one or more of the first desired path and one or more intermediate paths associated with each of the respective one or more intermediate locations, and the proceeding path includes one or more of the intermediate paths and the second guiding path.

Example 22 can include, or can optionally be combined with the subject matter of Examples 1-21 to optionally include wherein the path transformation module includes a relaxation module, and the relaxation module relaxes the second guiding path based on jitter originating in the first desired path.

Example 23 can include, or can optionally be combined with the subject matter of Examples 1-22 to optionally include wherein the map module includes a decimation module configured to decimate the first desired path, each decimation of the first desired path corresponding to a discrete point of a series of discrete points along the first desired path.

Example 24 can include, or can optionally be combined with the subject matter of Examples 1-23 to optionally include a storage module in communication with the path transformation module, and the storage module is configured to store the second guiding path.

Example 25 can include, or can optionally be combined with the subject matter of Examples 1-24 to optionally include a navigation system in communication with the path transformation module, the navigation system is configured for coupling at the front hitch location of the leading vehicle, and the navigation system receives the second guiding path.

Example 26 can include, or can optionally be combined with the subject matter of Examples 1-25 to optionally include wherein the navigation system is coupled with an output device, and the output device is configured to convey the second guiding path.

Example 27 can include, or can optionally be combined with the subject matter of Examples 1-26 to optionally include wherein the path transformation module includes a vector module in communication with the propagation module, the path transformation module configured to generate direction unit vectors at each point along the first desired path, the second guiding path, and the one or more intermediate paths.

Example 28 can include, or can optionally be combined with the subject matter of Examples 1-27 to optionally include a decomposition module in communication with the dimensional characteristic module, the decomposition module configured to decompose each vehicle of the implement train into component vehicles have a respective single axle and respective component rear hitch and component front hitch locations.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for guiding a leading vehicle according to a desired trailing vehicle path, the method comprising:
   determining a first desired path for a rear hitch location of a designated trailing vehicle of an implement train including at least the designated trailing vehicle and a leading vehicle;
   generating one or more proceeding paths for one or more intermediate locations along the implement train and a front hitch location of the leading vehicle with a propagation and transformation algorithm, generating the one or more proceeding paths with the propagation and transformation algorithm including:
      propagating a preceding path of one of the rear hitch location or one of the one or more intermediate locations to an immediately proceeding location of one of the one or more intermediate locations or the front hitch location, wherein the first desired path is a first preceding path, and
      transforming the preceding path according to intervening dimensional characteristics of the implement train to generate the proceeding path; and
   generating a second guiding path for the front hitch location of the leading vehicle with the propagation and transformation algorithm based on the immediately preceding path of the intermediate location closest to the front hitch location.

2. The method of claim 1, wherein generating one or more proceeding paths for one or more intermediate locations along the implement train and a front hitch location of the leading vehicle includes repeating generation of the one or more proceeding paths for each of the one or more intermediate locations and the front trailing hitch with the propagation and transformation algorithm based on immediately preceding paths that respectively precede the one or more proceeding paths.

3. The method of claim 1 comprising guiding the leading vehicle along the second guiding path, the second guiding path output through a navigation system at the front hitch location, and
   automatically guiding the designated trailing vehicle along the first desired path with guidance of the leading vehicle along the second guiding path.

4. The method of claim 1, wherein the leading vehicle is the only vehicle of the implement train with a navigation system sensor.

5. The method of claim 1, wherein the intervening dimensional characteristics of the implement train includes the dimensional characteristics between adjacent locations of the implement train including the rear hitch location of the designated trailing vehicle, the one or more intermediate locations and the front hitch location of the leading vehicle.

6. The method of claim 1, wherein generating the second guiding path is completed prior to moving the leading vehicle along the second guiding path.

7. The method of claim 1, wherein generating the second guiding path is conducted while moving the leading vehicle along the second guiding path.

8. The method of claim 1, wherein determining the first desired path for the rear hitch location of the designated trailing vehicle includes generating an instant direction unit vector of an instant point of respective discrete points along the first desired path based on the locations of one or more of a preceding point and a proceeding point of the respective discrete points relative to a location of the instant point.

9. The method of claim 8 comprising relaxing the second guiding path based on jitter originating in the first desired path.

10. The method of claim 1 comprising decomposing each vehicle of the implement train into component vehicles, each of the component vehicles including a respective component single axle and respective component rear hitch and component front hitch locations.

11. The method of claim 1, wherein determining the first desired path includes decimating the first desired path into a plurality of discrete points along the first desired path.

12. A method for guiding a leading vehicle according to a desired trailing vehicle path, the method comprising:
- determining a first desired path for a rear hitch location of a designated trailing vehicle of one or more trailing vehicles of an implement train, the implement train including a leading vehicle having a front hitch location;
- generating a first direction unit vector at an instant point along the first desired path for the rear hitch location based on the instant point and one or more path points proceeding and preceding the instant point along the first desired path; and
- generating one or more proceeding path points for one or more intermediate locations along the implement train and the front hitch location of the leading vehicle with a propagation and transformation algorithm, generating the one or more proceeding path points with the propagation and transformation algorithm including:
  - propagating a preceding path point of one of the rear hitch location or one of the one or more intermediate locations to an immediately proceeding location of one of the one or more intermediate locations or the front hitch location, wherein the first direction unit vector is a first preceding path point, and
  - transforming the preceding path point according to intervening dimensional characteristics of the implement train to generate the proceeding path point; and
- generating a second guiding path point for the front hitch location with the propagation and transformation algorithm based on the immediately preceding path point of an intermediate location of the one or more intermediate locations closest to the front hitch location.

13. The method of claim 12 comprising repeating generation of both of the one or more proceeding path points and the second guiding path point for a plurality of points along the first desired path, repeated generation generating a corresponding plurality of second guiding path points that form a second guiding path.

14. The method of claim 13, wherein generating the second guiding path is completed prior to moving the leading vehicle along the second guiding path.

15. The method of claim 13, wherein generating the second guiding path is conducted while moving the leading vehicle along the second guiding path.

16. The method claim 12, wherein generating both of the one or more proceeding path points and the second guiding path point includes generation of corresponding direction unit vectors.

17. The method of claim 12, wherein generating the first direction unit vector includes:
- determining rear and forward chord vectors respectively extending from a preceding point on the first desired path to the instant point and from the instant point to a proceeding point on the first desired path,
- measuring a change in direction between the rear and forward chords,
- associating the first direction unit vector to the rear hitch location based on one of the rear or forward chord vectors and the measured change in direction.

18. The method of claim 17, wherein generating both of the one or more proceeding path points includes generating a designated trailing vehicle intermediate direction unit vector for an intermediate location on the designated trailing vehicle closer to the leading vehicle than the rear hitch location,
- generating the designated trailing vehicle intermediate direction unit vector including combining the rear chord vector with a fraction of the change in direction based on the distance from the rear hitch location to the intermediate location on the designated trailing vehicle.

19. The method of claim 12 comprising guiding the leading vehicle along the second guiding path, the second guiding path output through a navigation system at front hitch location, and
- automatically guiding the designated trailing vehicle along the first desired path with guidance of the leading vehicle along the second guiding path.

20. The method of claim 12, wherein the leading vehicle is the only vehicle of the implement train with a navigation system sensor.

21. A system for guiding a leading vehicle according to a desired trailing vehicle path comprising:
- a map module including a first desired path for a rear hitch location of a designated trailing vehicle of an implement train including a leading vehicle;
- a dimensional characteristic module including dimensional characteristics for each of the vehicles of the implement train, the rear hitch location of the designated trailing vehicle, the front hitch location of the leading vehicle and one or more intermediate locations between the rear and front hitch locations; and
- a path transformation module configured to generate a second guiding path for a front hitch location of a leading vehicle based on the first desired path, wherein the designated trailing vehicle automatically follows the first desired path where the leading vehicle follows the second guiding path, the path transformation module includes:
  - a propagation module in communication with the dimensional characteristic and the map modules, the propagation module configured to propagate and transform a preceding path to a proceeding path, the preceding path includes one or more of the first desired path and one or more intermediate paths associated with each of the respective one or more intermediate locations, and the proceeding path includes one or more of the intermediate paths and the second guiding path.

22. The system of claim 21, wherein the path transformation module includes a relaxation module, and the relaxation module relaxes the second guiding path based on jitter originating in the first desired path.

23. The system of claim 21, wherein the map module includes a decimation module configured to decimate the first desired path, each decimation of the first desired path corresponding to a discrete point of a series of discrete points along the first desired path.

24. The system of claim 21 comprising a storage module in communication with the path transformation module, and the storage module is configured to store the second guiding path.

25. The system of claim 21 comprising a navigation system in communication with the path transformation module, the navigation system is configured for coupling at the front hitch location of the leading vehicle, and the navigation system receives the second guiding path.

26. The system of claim 25, wherein the navigation system is coupled with an output device, and the output device is configured to convey the second guiding path.

27. The system of claim 21, wherein the path transformation module includes a vector module in communication with the propagation module, the path transformation module configured to generate direction unit vectors at each point along the first desired path, the second guiding path, and the one or more intermediate paths.

28. The system of claim 21 comprising a decomposition module in communication with the dimensional characteristic module, the decomposition module configured to decompose each vehicle of the implement train into component vehicles have a respective single axle and respective component rear hitch and component front hitch locations.

* * * * *

UNITED STATES PATENT AND TRADEMARK OFFICE
CERTIFICATE OF CORRECTION

PATENT NO. : 8,825,263 B1  
APPLICATION NO. : 13/795700  
DATED : September 2, 2014  
INVENTOR(S) : Robert Leonard Nelson, Jr.

It is certified that error appears in the above-identified patent and that said Letters Patent is hereby corrected as shown below:

In the Specification

In column 11, line 54, delete "cords" and insert --chords--, therefor

In column 15, line 21, delete "I" and insert --i--, therefor

In column 15, line 40-45, delete 2nd Instance of " $UDV_{Behind} = \dfrac{\text{Chord Behind}}{\text{Distance Behind}}$ " and insert -- $UDV_{Ahead} = \dfrac{\text{Chord Ahead}}{\text{Distance Ahead}}$ --, therefor In column 15, line 55-56, delete " $\text{Rate of Direction Change} = \dfrac{\text{Direction Change}}{(\text{Distance Behind} + \text{Distance Ahead}/2)}$ " and insert -- $\text{Rate of Direction Change} = \dfrac{\text{Direction Change}}{(\text{Distance Behind} + \text{Distance Ahead})/2}$ --, therefor Signed and Sealed this  
Fifteenth Day of September, 2015

Michelle K. Lee  
*Director of the United States Patent and Trademark Office*